(12) United States Patent
Ramireddy et al.

(10) Patent No.: US 11,901,996 B2
(45) Date of Patent: Feb. 13, 2024

(54) METHODS AND APPARATUSES FOR ENHANCEMENT ON BASIS SUBSET INDICATION FOR TWO-CODEBOOK BASED CSI REPORTING

(71) Applicant: Fraunhofer-Gesellschaft zur Förderung der angewandten Forschung e.V., Munich (DE)

(72) Inventors: Venkatesh Ramireddy, Erlangen (DE); Marcus Grossmann, Erlangen (DE); Markus Landmann, Erlangen (DE)

(73) Assignee: Fraunhofer-Gesellschaft zur Förderung der angewandten Forschung e.V

( * ) Notice: Subject to any disclaimer, the term of this patent is extended or adjusted under 35 U.S.C. 154(b) by 155 days.

(21) Appl. No.: 17/606,924

(22) PCT Filed: Apr. 14, 2020

(86) PCT No.: PCT/EP2020/060397
§ 371 (c)(1),
(2) Date: Oct. 27, 2021

(87) PCT Pub. No.: WO2020/221581
PCT Pub. Date: Nov. 5, 2020

(65) Prior Publication Data
US 2022/0224390 A1  Jul. 14, 2022

(30) Foreign Application Priority Data

May 2, 2019  (EP) .................................. 19172422
Aug. 12, 2019  (EP) .................................. 19191235

(51) Int. Cl.
*H04B 7/06*  (2006.01)
*H04B 7/0417*  (2017.01)
(Continued)

(52) U.S. Cl.
CPC .......... *H04B 7/0663* (2013.01); *H04B 7/0417* (2013.01); *H04B 7/0478* (2013.01);
(Continued)

(58) Field of Classification Search
None
See application file for complete search history.

(56) References Cited

U.S. PATENT DOCUMENTS 9,832,732 B2 * 11/2017 Ouchi ................. H04W 52/245

OTHER PUBLICATIONS

Communication Under Rule 71(3) EPC Intention to Grant, European Patent Office, Application No. 20 717 208.1, dated Mar. 14, 2023.
(Continued)

*Primary Examiner* — Minh Trang T Nguyen
(74) *Attorney, Agent, or Firm* — Burr & Forman LLP; Jeffrey H. Kamenetsky, Esq.

(57) ABSTRACT

The present disclosure relates to methods and apparatuses (UE, network node or gNB) for CSI reporting. The method performed by a UE comprises: receiving from the gNB, a radio signal via a MIMO channel, wherein the radio signal contains at least one DL-RS according to a DL-RS configuration; estimating said MIMO channel based on said received at least one DL reference signal for configured subbands; calculating a precoder matrix or a CSI matrix for a number of antenna ports of the gNB and configured subbands; the precoder matrix based on a first codebook and on a second codebook and a set of combining coefficients for complex scaling/combining one or more of vectors selected from the first codebook and the second codebook; and reporting, to the gNB, a CSI feedback report and/or a PMI/RI, used to indicate the precoder matrix or the CSI matrix for the configured antenna ports and subbands.

12 Claims, 5 Drawing Sheets

(51) Int. Cl.
*H04B 7/0456* (2017.01)
*H04L 25/02* (2006.01)

(52) U.S. Cl.
CPC ........... *H04B 7/063* (2013.01); *H04B 7/0626* (2013.01); *H04B 7/0639* (2013.01); *H04L 25/0202* (2013.01)

(56) References Cited

OTHER PUBLICATIONS

International Search Report, European Patent Office, Application No. PCT/EP2020/060397, dated May 20, 2020.
Fraunhofer IIS et al. "Enhancements on Type-II CSI Reporting" 3GPP TSG-RAN WG1 #95, Spokeanee, USA, Nov. 12-16, 2018 R11813130.
Mediatek Inc: "CSI Enhancement For MU-MIMO" 3GPP Draft; R1-190186, Taipei, Taiwan, Jan. 21-25, 2019, R1-1901286.
ZTE: "CSI Enhancement for MU-MIMO Support" 3GPP TSG RAN WG1 Meeting #96, Athens Greece, Feb. 25-Mar. 1, 2019, R1-1903343.
NEC: "Discussion on CSI Reporting" 3GPP TSG RAN WG1 #96bis, Xi'an, China, Apr. 8-12, 2019, R1-1904662.
NTT Docomo "Type II CSI Enhancement for MU-MIMO Support" 3GPP TSG RAN WG1 Meeting #96bis, Xi'an, China, Apr. 8-12, 2019, R1-1904965.

* cited by examiner

METHODS AND APPARATUSES FOR ENHANCEMENT ON BASIS SUBSET INDICATION FOR TWO-CODEBOOK BASED CSI REPORTING

CROSS-REFERENCE TO RELATED APPLICATION

This application is a national stage application, filed under 35 U.S.C. § 371, of International Patent Application No. PCT/EP2020/060397 filed on Apr. 14, 2020, European Patent Application No. 19172422.8, filed May 2, 2019, and European Patent Application No. 19191235.1, filed Aug. 12, 2019, which are incorporated by reference herein in their entirety.

TECHNICAL FIELD

The present disclosure relates to the field of wireless communications, and in particular, to methods and apparatuses for efficient feedback reporting for at least a New Radio- (NR-) based wireless communication network system, which feedback reporting includes Channel State Information (CSI).

BACKGROUND

In a wireless communications system, such as New Radio, also called 3GPP Fifth Generation wireless communications system or 5G for short, downlink (DL) and uplink (UL) signals convey data signals, control signals comprising DL control information (DCI) and/or uplink control information (UCI), and a number of reference signals (RSs) used for different purposes. A radio network node or a radio base station or a gNodeB (or gNB or gNB/TRP (Transmit Reception Point)) transmits data and DCI through the so-called physical downlink shared channel (PDSCH) and the physical downlink control channel (PDCCH), respectively.

A UE transmits data and UCI through the so-called physical uplink shared channel (PUSCH) and physical uplink control channel (PUCCH), respectively. Moreover, the DL or UL signal(s) of the gNB respectively the user equipment (UE or a radio device) may contain one or multiple types of RSs including a channel state information RS (CSI-RS), a demodulation RS (DM-RS), and a sounding RS (SRS). The CSI-RS (SRS) is transmitted over a DL (UL) system bandwidth part and used at the UE (gNB) for CSI acquisition. The DM-RS is transmitted only in a bandwidth part of the respective PDSCH/PUSCH and used by the UE/gNB for data demodulation.

One of many key feature of 5G is the use of multi-input multi-output (MIMO) transmission schemes to achieve high system throughput compared to previous generations of mobile systems. MIMO transmission generally demands the availability of accurate CSI used at the gNB for a signal precoding using a precoding matrix of the data and control information. The current third Generation Partnership Project Release 15 specification (3GPP Rel. 15) therefore provides a comprehensive framework for CSI reporting. The CSI is acquired in a first step at the UE based on received CSI-RS signals transmitted by the gNB. The UE determines in a second step based on the estimated channel matrix a precoding matrix from a predefined set of matrices called 'codebook'. The selected precoding matrix is reported in a third step in the form of a precoding matrix identifier (PMI) and rank identifier (RI) to the gNB.

In the current Rel.-15 NR specification, there exist two types (Type-I and Type-II) for CSI reporting, where both types rely on a dual-stage (i.e., two components) $W_1 W_2$ codebook. The first codebook, or the so-called first stage precoder, $W_1$, is used to select a number of beam vectors from a Discrete Fourier Transform-based (DFT-based) matrix which is also called the spatial codebook. The second codebook, or the so-called second stage precoder, $W_2$, is used to combine the selected beams. For Type-I and Type-II CSI reporting, $W_2$ contains phase-only combining coefficients and complex combing coefficients, respectively. Moreover for Type-II CSI reporting, $W_2$ is calculated on a subband basis such that the number of columns of $W_2$ depends on the number of configured subbands. Here, a subband refers to a group of adjacent physical resource blocks (PRBs). Although Type-II provides a significant higher resolution than Type-I CSI feedback, one major drawback is the increased feedback overhead for reporting the combining coefficients on a subband basis. The feedback overhead increases approximately linearly with the number of subbands, and becomes considerably large for large numbers of subbands. To overcome the high feedback overhead of the Rel.-15 Type-II CSI reporting scheme, it has recently been decided in 3GPP RAN#81 [2] to study feedback compression schemes for the second stage precoder $W_2$.

Before going into the detailed description of the solution(s) of the present embodiments, an informative description is provided in order to better understand the problems of the prior art followed by a described how said problems are solved according to the embodiments of the present disclosure.

3GPP Rel.-15 Dual-Stage Precoding and CSI Reporting

Assuming a rank-r (r may be up to two) transmission and a dual-polarized antenna array at the gNB with configuration $(N_1, N_2, 2)$, the Rel.-15 double-stage precoder for the CSI reporting for the s-th subband is given by:

$$W(s) = W_1 w_2(s),$$

$$= W_1 W_A \hat{w}_2(s)$$

where the precoder matrix W has $2N_1 N_2$ rows corresponding to the number of antenna ports, and S columns for the reporting subbands/PRBs. The matrix $W_1^{(l)} \in \mathbb{C}^{PN_1 N_2 \times 2U}$ is the wideband first-stage precoder containing 2U spatial beams for both polarizations which are identical for all S subbands, and $W_A$ is a diagonal matrix containing 2U wideband amplitudes associated with the 2U spatial beams, and $\hat{w}_2(s)$ is the second-stage precoder containing 2U subband (subband amplitude and phase) complex frequency-domain combining coefficients associated with the 2U spatial beams for the s-th subband.

According to prior art [1], the reporting and quantization of wideband amplitude matrix $W_A$ and subband combining coefficients in $\hat{w}_2(s)$ are quantized and reported as follows.

The wideband amplitude corresponding to the strongest beam which has an amplitude value of 1 is not reported. The wideband amplitude values associated with the remaining 2U−1 beams are reported by quantizing each amplitude value with 3 bits.

The subband amplitudes and phase values of the coefficients associated with the first leading beam are not reported (they are assumed to be equal to 1 and 0).

For each subband, the amplitudes of the B coefficients associated with the first B−1 leading beams (other than the first leading beam) are quantized with 1 bit (quantization levels [$\sqrt{0.5}$,1]). The amplitude values of the remaining 2U−B beams are not reported (they are assumed to be equal to 1).

For each subband, the phase values of the B−1 coefficients associated with the first B−1 leading beams (other than the first leading beam) are quantized with 3 bits. The phase values of the remaining 2U B beams are quantized with 2 bits.

The number of leading beams for which the subband amplitude is reported is given by B=4, 4 or 6 when the total number of configured spatial beams U=2, 3, or 4, respectively.

SUMMARY

In view of the drawbacks disclosed earlier, there is provided a communication device or a radio device or a user equipment (UE) and a method therein for providing a channel state information (CSI) feedback in a wireless communication system including at least the UE and a gNB or a radio network node. The UE comprising a processor and a memory, said memory containing instructions executable by said processor whereby said UE is operative/configured to perform any one of the method steps disclosed herein.

There is also provided a network node or gNB comprising a processor and a memory, said memory containing instructions executable by said processor whereby said gNB is operative/configured to perform method steps as will be described.

According to an aspect of exemplary embodiments herein, the method performed by the UE includes: receiving from a network node, gNB, a radio signal via a Multiple Input Multiple Output (MIMO) channel, wherein the radio signal contains at least one DownLink (DL) reference signal according to a DL reference signal configuration; estimating said MIMO channel based on said received at least one DL reference signal for configured subbands ($N_3$); calculating a precoder matrix or a Channel State Information (CSI) matrix for a number of antenna ports of the gNB and configured subbands; the precoder matrix being based on a first codebook and on a second codebook and a set of combining coefficients for complex scaling/combining one or more of vectors selected from the first codebook and the second codebook; where, the first codebook contains one or more transmit-side spatial beam components of the precoder matrix, the second codebook contains one or more delay components of the precoder matrix or CSI matrix. The method further comprises, determining a common delay domain (CDD) basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}$ values; and reporting, to the gNB, a CSI feedback report and/or a Precoder matrix Indicator, PMI and/or a PMI/Rank Indicator (PMI/RI) used to indicate the precoder matrix or the CSI matrix for the configured antenna ports and configured subbands; wherein the selected vectors from the CDD basis subset are indicated in the reporting, for each layer, by a layer-specific delay domain (LDD) basis subset indicator; and the parameter $\overline{D}_{in}$ is reported to the gNB.

According to another aspect, there is provided a method performed by a network node or a gNB, the method comprising: transmitting, to a UE, a radio signal via a MIMO channel, wherein the radio signal contains at least one DL, reference signal according to a DL reference signal configuration; for enabling the UE to: estimate said MIMO channel based on said received at least one DL reference signal for configured subbands, $N_3$; calculate a precoder matrix or a CSI matrix for a number of antenna ports of the gNB and configured subbands; the precoder matrix being based on a first codebook and on a second codebook and a set of combining coefficients for complex scaling/combining one or more vectors selected from the first codebook and the second codebook; where the first codebook contains one or more transmit-side spatial beam components of the precoder matrix or CSI matrix, the second codebook contains one or more delay components of the precoder matrix or CSI matrix; determine a CDD basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}$ values; and receiving, from the UE, a CSI feedback report and/or a PMI/RI, used to indicate the precoder matrix or the CSI matrix for the configured antenna ports and configured subbands; wherein the selected vectors from the CDD basis subset are indicated in the report, for each layer, by a LDD basis subset indicator; and the parameter $\overline{D}_{in}$ is reported to the gNB.

An advantage with embodiments herein is to provide a feedback compression scheme for a second stage precoder that reduces the feedback overhead for reporting precoder coefficients.

Another advantage of the present embodiments is to provide several schemes for low-feedback overhead reporting for spatial domain and delay domain basis indicators and delay-domain combining coefficients.

Additional advantages will be described and explained in detail in the description part of this disclosure.

DETAILED DESCRIPTION

Figures 1A, 1B:
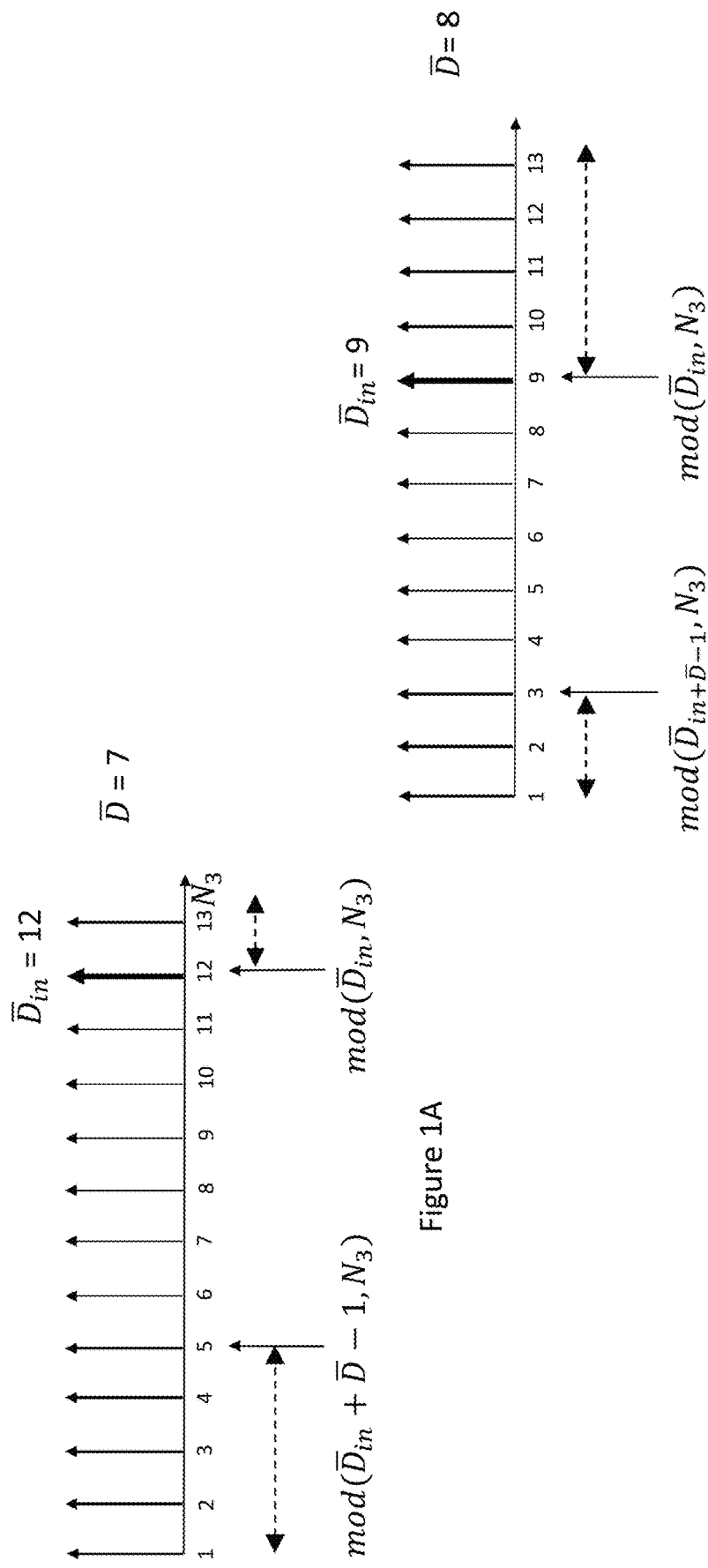
FIG. 1A illustrates an example of CDD basis subset configuration.
FIG. 1B illustrates another example of CDD basis subset configuration.

As previously described, the embodiments herein provide a feedback compression scheme for the second stage precoder $W_2$ that drastically reduces the feedback overhead for reporting, by the UE, the precoder coefficients.

The UE comprises a transceiver which is configured to receive from a transmitter a radio signal via a MIMO channel, where the radio signal contains DL reference signals (e.g., CSI-RS) according to a DL reference signal configuration, and the UE, by means of a processor is operative to: estimate the MIMO channel between the gNB and the UE based on the received DL reference signals for the configured subbands, calculate, based on a performance metric, a precoder matrix or a CSI matrix, for a number of gNB' antenna/DL RS ports and configured subbands, that is based on two codebooks and a set of combining coefficients for complex scaling/combining the one or more of the vectors selected from the first and second codebook, where the first codebook contains one or more transmit-side spatial beam components of the CSI matrix, and the second codebook contains one or more delay components of the CSI matrix, and report the CSI feedback/PMI and RI to indicate the precoder matrix CSI matrix per layer for the configured antenna/DL-RS ports and subbands.

Throughout the present disclosure, the precoder matrix and the CSI matrix are used interchangeably meaning that they are equivalent.

In accordance with embodiments, the first codebook comprises a DFT matrix or oversampled DFT-matrix of size $N_1N_2 \times O_{1,1}N_1O_{1,2}N_2$ containing the spatial beam components ($N_1N_2 \times 1$ vectors) of the precoder matrix. Here, $N_1$ and $N_2$ refer to the number of antenna ports of the same polarization in the first and second dimension of the antenna array, respectively. In general, for a two-dimensional (2D) antenna array, $N_1$ and $N_2$ are both greater than 1, whereas for a linear (1D (one-dimensional)) either $N_1$ or $N_2$ is one. The total number of antenna ports for a dual-polarized antenna array is $2N_1N_2$. Furthermore, $O_{1,1} \in \{1,2,3,\ldots\}$ and $O_{1,2} \in \{1,2,3,\ldots\}$ refer to the oversampling factors of the codebook matrix with respect to the first and second dimension, respectively.

The first codebook comprises a set of $P_{CSI-RS}/2 \times 1$ column vectors, where the m-th column vector contains a single 1 at the m-th position of the vector and zeros elsewhere. Here, the parameter $P_{CSI-RS}$ denotes the total number of CSI-RS ports used by the UE for channel estimation and precoder coefficient calculation. This codebook may be called as port selection codebook and is used when a beamforming operation is performed by the gNB such that each antenna port corresponds to a beam-formed port. The parameter $P_{CSI-RS}$ may be higher-layer configured by the gNB e.g. using a RRC (Radio Resource Control) signaling.

The second codebook comprises a second DFT, or oversampled DFT-codebook matrix of size $N_3 \times N_3O_2$ containing the delay components (represented by $N_3 \times 1$ DFT-vectors) of the precoder matrix, where $N_3$ refers to the configured number of subbands, and $O_2$ refers to the oversampling factor $O_2 = 1, 2, \ldots$ of the second codebook matrix. Each DFT vector models a linear phase increase over the $N_3$ subbands, and each vector is therefore associated with a delay in the transformed (delay) domain. Therefore, in the following, the DFT vectors of the second codebook are referred to as delay vectors or simply delays, and the combining coefficients used for the complex scaling/combining of the one or more of the vectors selected from the first and second codebook as delay-domain combining coefficients.

In accordance with embodiment, the UE is configured to determine a rank indicator (RI) from the MIMO channel estimate and to configure the CSI matrix (or precoder matrix) with RI layers. For the l-th layer of the CSI matrix, the UE may be configured to select a subset of $U^{(l)}$ beam vectors from the first codebook, a subset of DM delay vectors from the second codebook and $2U^{(l)}D^{(l)}$ combining coefficients, and to indicate in the CSI report the selected RI and the selected beam and delay vectors and combining coefficients of the CSI matrix.

In accordance with embodiment, the UE is configured to report for each layer of the CSI matrix a spatial domain (SD) basis indicator indicating the selected subset of $U^{(l)}$ beam vectors of the l-th layer and a delay domain (DD) basis indicator indicating the selected subset of $D^{(l)}$ delays vectors of the l-th layer.

In accordance with an embodiment, the CSI matrix used for CSI (PMI) reporting for the configured $2N_1N_2$ (or $P_{CSI-RS}$) antenna/DL-RS ports and configured $N_3$ subbands may be represented for the first polarization of the antenna ports and l-th transmission layer as $$G_1^{(l)} = \alpha^{(l)} \Sigma_{u=0}^{U^{(l)}-1} b_u^{(l)} \Sigma_{d=0}^{D^{(l)}-1} \gamma_{1,u,d}^{(l)} d_d^{(l)H},$$

and for the second polarization of the antenna ports and l-th transmission layer as $$G_2^{(l)} = \alpha^{(l)} \Sigma_{u=0}^{U^{(l)}-1} b_u^{(l)} \Sigma_{d=0}^{D^{(l)}-1} \gamma_{2,u,d}^{(l)} d_d^{(l)H},$$

where $b_u^{(l)}$ ($u=0, \ldots, U^{(l)}-1$) represents the u-th spatial beam vector for the l-th layer selected from the first codebook, $d_d^{(l)}$ ($d=0, \ldots, D^{(l)}-1$) is the d-th delay vector associated with the l-th layer selected from the second codebook, $\gamma_{p,u,d}^{(l)}$ is the complex delay-domain combining coefficient associated with the u-th beam, d-th delay and p-th polarization, $U^{(l)}$ represents the number of spatial beam vectors, $D^{(l)}$ represents the number of delay vectors, and $\alpha^{(l)}$ is a normalizing scalar.

In contrast to the 3GPP Release 15 Type-II single-codebook CSI reporting, the herein proposed two-codebook CSI reporting scheme (based on matrices $G_1^{(l)}$ and $G_2^{(l)}$) is based on precoding operations in the delay-domain instead of the frequency domain. In this way, the UE may exploit the sparsity of the $2U^{(l)}$ beam-formed channel impulse responses (obtained by combining the selected beam vectors $b_u^{(l)}$ and the MIMO channel impulse response) when optimizing for the delay domain combining coefficients $\gamma_{p,u,d}^{(l)}$.

Note that the precoding operation (by vectors $b_u^{(l)}$ and $d_d^{(l)}$) leads to an energy concentration of the MIMO channel impulse in both space and delay domain dimensions, such that each of the corresponding $2U^{(l)}$ beam-formed channel impulse response is characterized by only a few significant channel delays/taps. These channel delays are used by the UE for determining the delay domain combining coefficients $\gamma_{p,u,d}^{(l)}$. In this way, the number of combining coefficients per layer to be reported reduces from $2U^{(l)}N_3$ for the Rel. 15 Type-II CSI single-codebook reporting scheme to $2U^{(l)}D^{(l)}$, where $D^{(l)} \ll N_3$, for the proposed two-codebook CSI reporting scheme.

In the following sections, several schemes for low-feedback overhead reporting for the SD and DD basis indicators and delay-domain combining coefficients are proposed in according with some embodiments.

CSI Report Configuration

In accordance with some embodiments, the UE is configured from the gNB with a CSI report configuration, the CSI report configuration contains the higher-layer (e.g., RRC) parameter(s) $U^{(l)}$ and $D^{(l)}$ representing the number of beam vectors and delay vectors, respectively, for the l-th layer of the CSI matrix.

In accordance with an embodiment, the UE is configured from the gNB with a CSI report configuration, the CSI report configuration contains the higher-layer (e.g., RRC) parameter(s) $D^{(l)}$, representing the number of delays per beam for the l-th layer, used for the configuration of the CSI matrix (or precoder matrix). The number of configured delays $D^{(l)}$ per layer has a large influence on the feedback overhead for reporting the selected $2\Sigma_l U^{(l)} D^{(l)}$ combining coefficients for the layers. In order to reduce the feedback overhead for reporting the combining coefficients for all layers and the UE complexity for calculating the CSI matrix, the UE may be configured with different number of delays $D^{(l)}$ per layer, or per layer-group (i.e., a subset of layers). In the following, some examples for the delay configuration are presented.

In one example, the number of delays $D^{(l)}$ is layer-independent and identical for all layers, such that $D^{(l)}=D$, and the gNB may configure/signal only a single parameter D for the configuration of the CSI matrix. For instance, for a rank (RI) of 2, $D=D^{(0)}=D^{(1)}$, for RI=3, $D=D^{(0)}=D^{(1)}=D^{(2)}$, for RI=4, $D=D^{(0)}=D^{(1)}=D^{(2)}=D^{(3)}$.

In another example, the number of delays $D^{(l)}$ is configured for subsets of layers, e.g., for a first subset of layers (e.g., the first and second layers), $D^{(1)}=\lceil \alpha_1 D^{(0)} \rceil$, and for a second subset of layers (the third layer or the third layer and fourth layer), $D^{(3)}=\lceil \alpha_2 D^{(2)} \rceil$, and the gNB signals two parameters $D^{(0)}$ and $D^{(2)}$ for the configuration of the CSI matrix. The parameters $\alpha_1$ and $\alpha_2$ are either higher-layer configured or fixed by specification or reported by the UE. Examples of $\alpha_1$ and $\alpha_2$ are $\alpha_t \in \{1/8, 1/4, 3/8, 1/3, 1/2, 2/3, 3/4, 1\}$, $t \in \{1,2\}$.

In another example, instead of configuring both $D^{(0)}$ and $D^{(2)}$, only $D^{(0)}$ is configured and $D^{(2)}$ is derived at/by the UE from $D^{(0)}$ as $D^{(2)}=\lceil \alpha_0 D^{(0)} \rceil$, where $\alpha_0 ] \mathbb{R}^+$. Possible values of $\alpha_0$ are given by $\alpha_0=\{1/8, 1/4, 3/8, 1/3, 1/2, 2/3, 3/4, 1\}$.

In another example, the gNB configures a single parameter $D^{(0)}$ for the first layer, and the UE derives the parameter(s) $D^{(l)}$, $l>0$ for the remaining layers by e.g. a rule, although not necessarily.

Examples of a rule are given in the following.

In one instance $D^{(l)}=D^{(0)}$, $l>0$ may be identical for all layers.

In another instance, $D^{(l)}$ may be identical for the first two layers, $D^{(0)}=D^{(1)}$, and different for the third and fourth layers, $D^{(3)} \geq D^{(2)} \geq D^{(0)}$, or $D^{(3)} \leq D^{(2)} \leq D^{(0)}$.

In another instance, $D^{(l)}$ may be identical for the first three layers and different for the fourth layer, $D^{(3)} \leq D^{(0)}$ or $D^{(3)} \geq D^{(0)}$.

In another instance, $D^{(l)}$ may be different for all layers, $D^{(l+1)} \neq D^{(l)}$, $l \in [0,2]$. In another instance, for RI=2, the delays of the second layer may be derived from $D^{(1)}=\alpha_0 D^{(0)}$, where $\alpha_0 \in \mathbb{R}^+$. For RI=3, the delays of the second layer and third may be derived from $D^{(1)}=\lceil \alpha_0 D^{(0)} \rceil$ and $D^{(2)}=\lceil \alpha_0 D^{(0)} \rceil$, where $\alpha_0 \in \mathbb{R}^+$.

For RI=4, the delays of the second layer, third and fourth layers may be derived from $D^{(1)}=\lceil \alpha_0 D^{(0)} \rceil$, $D^{(2)}=\lceil \alpha_0 D^{(0)} \rceil$, and $D^{(3)}=\lceil \alpha_0 D^{(0)} \rceil$ where $\alpha_0 \in \mathbb{R}^+$.

In another instance, for RI=3, the UE is configured by a single value $D^{(0)}$ and $D^{(0)}=D^{(1)} \neq D^{(2)}$ and the delays of the third layer may be derived from $D^{(2)}=\lceil \alpha_0 D^{(0)} \rceil$, where $\alpha_0 \in \mathbb{R}^+$.

In another instance, for RI=3, the UE is configured by a single value $D^{(0)}$ and $D^{(0)}=D^{(2)} \neq D^{(1)}$ and the delays of the second layer may be derived from $D^{(1)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)} \neq D^{(1)}=D^{(2)}=D^{(3)}$ and the delays of the second, third and fourth layers may be derived from $D^{(1)}=D^{(2)}=D^{(3)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)}=D^{(1)} \neq D^{(2)}=D^{(3)}$ and the delays of the third and fourth layer may be derived from $D^{(2)}=D^{(3)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)}=D^{(1)} \neq D^{(2)} \neq D^{(3)}$ and the delays of the fourth layer may be derived from $D^{(3)}=\lceil \alpha_0 D^{(0)} \rceil$, and the delays of the second layer may be derived from $D^{(1)}=\lceil \alpha_0 D^{(0)} \rceil$, and the delays of the third and fourth layer may be derived from $D^{(2)}=D^{(3)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)} \neq D^{(1)}=D^{(2)} \neq D^{(3)}$ and the delays of the second layer may be derived from $D^{(1)}=\lceil \alpha_0 D^{(0)} \rceil$, and the delays of the third and fourth layer may be derived from $D^{(2)}=D^{(3)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)} \neq D^{(1)}=D^{(2)} \neq D^{(3)}$ and the delays of the fourth layer may be derived from $D^{(3)}=\lceil \alpha_0 D^{(0)} \rceil$, and the delays of the second and third layer may be derived from $D^{(1)}=D^{(2)}=\lceil \alpha_0 D^{(0)} \rceil$, where $\alpha_0 \in \mathbb{R}^+$.

In another instance, for RI=4, the UE is configured by a single value $D^{(0)}$ and $D^{(0)}=D^{(1)} \neq D^{(2)} \neq D^{(3)}$ and the delays of the third layer may be derived from $D^{(2)}=\lceil \alpha_0 D^{(0)} \rceil$ and the delays of the fourth layer may be derived from $D^{(3)}=\lceil \alpha_0 D^{(0)} \rceil$, where $\alpha_0 \in \mathbb{R}^+$.

In accordance with an embodiment, a UE may be configured with a single parameter D which denotes the total number of delays across all layers. The UE is then configured to calculate the required number of delays per layer ($D^{(l)}$) based on any performance enhancement/feedback reduction criterion such that $\Sigma_{l=0}^{RI-1} D^{(l)} \leq D$. The UE may then report, to the gNB, the assigned number of delays to the gNB.

In accordance with an embodiment, the configuration of delays may be dependent on the rank (RI) of the CSI matrix. For example, let $D^{(l,r)}$ denote the number of delays for the l-th layer and the r-th rank. For example, the number of delays per layer for RI≤2 may be identical. For instance, $D^{(0,1)}=D^{(1,1)}=D^{(0,2)}$.

In another example, the number of delays of the l-th layer for RI≤4 may be identical to the number of delays of the l-th layer for RI≥1.

In one instance, $D^{(0,1)}=D^{(0,2)}=D^{(0,3)}=D^{(0,4)}=D^{(1,2)}=D^{(1,3)}=D^{(1,4)}$, and $D^{(2,3)}=D^{(2,4)}=D^{(3,4)}$ where $D^{(l,r)}$ denotes the number of delays per layer associated with each RI, $r \in \{1,2,3,4\}$.

In another instance, $D^{(0,1)}=D^{(0,2)}=D^{(0,3)}=D^{(0,4)}=D^{(1,2)}=D^{(1,3)}=D^{(1,4)}$ and the delays $D^{(2,3)}$, $D^{(2,4)}$, $D^{(3,4)}$ are derived from the delays of RI≤2 as $D^{(2,3)}=D^{(2,4)}=D^{(3,4)}=\alpha_0 D^{(0,1)}$.

In another example, the number of delays per layer for RI>2 may not be identical to the number of delays per layer for RI≤2. For instance, $D^{(0,1)}=D^{(0,2)} \neq D^{(0,3)}=D^{(0,4)}$ or $D^{(1,2)} \neq D^{(1,3)}=D^{(1,4)}$, and $D^{(2,3)}=D^{(2,4)}=D^{(3,4)}$.

In another example, the number of delays per layer $D^{(l,r)}, \forall l$, for RI>2 may be derived from the number of delays of RI≤2. For instance, $D^{(0,1)}=D^{(0,2)}=D^{(1,2)}$ and the delays $D^{(l,r)}, \forall l, r>2$ are given by $D^{(0,3)}=D^{(0,4)}=D^{(1,3)}=D^{(1,4)}=D^{(2,3)}=D^{(2,4)}=D^{(3,4)}=\alpha_0 D^{(0,1)}$, where $\alpha_0 \in \mathbb{R}^+$.

In another example, for RI≥2, the number of delays for each layer and RI are different, $D^{(l,r)} \neq D^{(l',r')}$, $l \neq l'$, $r \neq r'$.

In accordance with an embodiment, the UE is configured to select the values $D^{(l,r)}$ or $D^{(l)}$ or $\alpha_i$, $i \in \{0,1,2\}$ and report the selected values of $D^{(l,r)}$ or $D^{(l)}$ or $\alpha_i$, $i \in \{0,1,2\}$.

In accordance with an embodiment, the higher-layer (e.g., RRC) parameter(s) $D^{(l)}$ (or $D^{(l,r)}$) may depend on the configured number of subbands $N_3$ by e.g. a known rule, e.g., $D^{(l)}=\lceil p^{(l)} N_3 \rceil$, $0<p<1$, such that the number of configured delays increases/decreases with increasing/decreasing values of $N_3$. Examples for $p^{(l)}$ are $p^{(l)} \in \{1/8, 1/4, 3/8, 1/3, 1/2, 2/3, 3/4, 1\}, t \in \{1,2\}$. Instead of signaling the parameter(s) $D^{(l)}$, the gNB may signal parameter(s) $p^{(l)}$ for the configuration of the CSI matrix.

In accordance with an embodiment, the UE is configured to receive from the gNB the higher layer parameter $N_3$, representing the number of configured subbands for the second codebook matrix. The number of subbands may depend on the number of CQI subbands $N_{CQI}$ (used for the calculation of the CQI) by a known rule. For example, the parameter $N_3$ may linearly increase/decrease with respect to the configured number of CQI subbands, $N_3 = N_{CQI} \times R$, $R \geq 1$, where R is a parameter to control the UE calculation complexity.

In accordance with an embodiment, the higher layer parameter R may be a UE capability. A UE may have only a limited processing capability for the calculation of the CSI matrix, and it may not be able to apply large values of $N_3$. In order to indicate that only a limited value range for $N_3$ is supported, the UE may indicate the supported value range for the parameter R to the gNB. For example, when $R \in \{1, 2\}$, a UE may indicate $R=1$ (limited processing capability), or $R=2$ (larger processing capability).

In accordance with an embodiment, the UE is configured from the gNB with a CSI report configuration, the CSI report configuration contains the higher-layer (e.g., RRC) parameter(s) $U^{(l)}$, representing the number of spatial beams for the l-th layer, used for the configuration of the CSI matrix. In one example, the number of beams $U^{(l)}$ may be identical for all layers and rank-independent, such that $U^{(l)} = U$, and the gNB signals a single parameter U for the configuration of the CSI matrix. In one example, U may be given by a limited value range, e.g., $U \in \{2,4,6\}$.

In another example, the gNB may configure a single parameter U for the spatial beams of the first layer of the CSI matrix, and the remaining $U^{(l)}$, $l>0$ are derived by the UE by a known rule. For instance, when RI=2, and the gNB configures) $U^{(0)}=6$, the number of spatial beams for the first layer may be given by $U^{(0)}=6$ and the number of spatial beams for the second layer is given by $U^{(1)}=4$ or $U^{(1)}=2$.

In another instance, when RI=3, and the gNB configures $U^{(0)}=6$, the number of spatial beams for the first layer may be given by $U^{(0)}=6$, the number of spatial beams for the second layer is given by $U^{(1)}=4$ or $U^{(1)}=2$, and the number of spatial beams for the third layer is given by $U^{(2)}=4$ or $U^{(2)}=2$.

In another instance, when RI=4 and the gNB configures U=6, the number of spatial beams for the first layer may be given by $U^{(0)}=6$, the number of spatial beams for the second layer is given by $U^{(1)}=4$ or $U^{(0)}=2$, the number of spatial beams for the third layer is given by $U^{(2)}=4$ or $U^{(2)}=2$, and the spatial beams for the third layer is given by $U^{(3)}=4$ or $U^{(3)}=2$.

In another example, the number of spatial beams $U^{(l)}$ is configured for subsets of layers, e.g., for a first subset of layers (e.g., the first and second layers), $U^{(1)} = \lceil \alpha_1 U^{(0)} \rceil$, and for a second subset of layers (the third or the third and fourth layers), $U^3 = \lceil \alpha_2 U^{(2)} \rceil$ and the gNB may be configured to signal two parameters $U^{(0)}$ and $U^{(2)}$ for the configuration of the CSI matrix. The parameters $\alpha_1$ and $\alpha_2$ are either higher-layer configured or fixed by specification or reported by the UE.

In another example, the number of spatial beams $U^{(l)}$ is configured for subsets of layers, e.g., for a first subset of layers (e.g., the first and second layers), $U^{(1)} = \lceil \alpha_1 U^{(0)} \rceil$, and for a second subset of layers (the third or the third and fourth layers), $U^{(2)} = \lceil \alpha_2 U^{(1)} \rceil$ and $U^{(3)} = \lceil \alpha_3 U^{(2)} \rceil$, and the gNB signals only a parameter) $U^{(0)}$ for the configuration of the CSI matrix. Examples of $\alpha_1$, $\alpha_2$ and $\alpha_3$ are $\alpha_t \in \{1/8, 1/4, 3/8, 1/3, 1/2, 2/3, 3/4, 1\}$, $t \in \{1, 2, 3\}$.

In one instance, for RI=3, the number of spatial beams for the first group of layers may be identical $U^{(0)}=U^{(1)}=2$ and the subset of layers for the second subset is given by $U^{(2)}=4$ or $U^{(2)}=6$.

In another instance, for RI=3, the number of spatial beams for the first group of layers may be identical $U^{(0)}=U^{(1)}=4$ and the subset of layers for the second subset is given by $U^{(2)}=6$ or $U^{(2)}=2$.

In another instance, for RI=3, the number of spatial beams for the first group of layers may be identical $U^{(0)}=U^{(1)}=6$ and the subset of layers for the second subset is given by $U^{(2)}=4$ or $U^{(2)}=2$.

In another instance, for RI=4, the number of spatial beams for the first group of layers may be identical $U^{(0)}=U^{(1)}=2$, and the subset of layers for the second subset is given by $U^{(2)}=U^{(3)}=6$ or $U^{(2)}=U^{(2)}=2$.

In another instance, for RI=4, the number of spatial beams for the first group of layers may be identical $U^{(0)}=U^{(1)}=4$, and the subset of layers for the second subset is given by $U^{(2)}=U^{(3)}=2$ or $U^{(2)}=U^{(2)}=6$.

In another instance, for RI=4, the number of spatial beams for the first group of layers may be identical $U^{(0)}=U^{(1)}=6$, and the subset of layers for the second subset is given by $U^{(2)}=U^{(3)}=2$ or $U^{(2)}=U^{(2)}=4$.

In accordance with embodiments, the UE may be configured with U=6 only for RI≤2. Configuring the UE with a large value of U enhances the performance but at the cost of increased feedback overhead. Therefore, the gNB may control the feedback overhead by limiting the large value of U only for certain RI's. In other words, the configuration of spatial beams can be rank-dependent.

In accordance with embodiments, the higher layer parameter U may be a UE capability. A UE may have only a limited processing capability for the calculation of the CSI matrix, and it may not be able to apply large values of U. In order to indicate that only a limited value range for U is supported, the UE may indicate the supported value range for the parameter U to the gNB. For example, when $U \in \{2,4,6\}$, a UE may indicate $U=\{2,4\}$ (limited processing capability), or $U=\{2,4,6\}$ (larger processing capability).

In accordance with an embodiment, a UE may be configured with a single parameter U which denotes the total number of spatial beams across all layers. The UE is then configured to calculate the required number of spatial beams per layer ($U^{(l)}$) based on any performance enhancement/feedback reduction criterion such that $\Sigma_{l=0}^{RI-1} U^{(l)} \leq U$. The UE may then be configured to report the assigned number of spatial beams per layer to the gNB.

In accordance with embodiments, the number of spatial beams for e layers (e≥1) may be apriori known to the UE, and the UE may be configured with a single parameter U which denotes the total number of spatial beams across RI-e layers. The UE is then configured to calculate the required number of spatial beams per layer ($U^{(l)}$ based on any performance enhancement/feedback reduction criterion such that $\Sigma_{l=0}^{RI-e} U^{(l)} \leq U$. The UE may be configured report the assigned number of spatial beams for the RI-e layers to the gNB.

In accordance with embodiments, a UE may be configured with one or more parameters, which denote(s) the total number of spatial beams across all layers in one or more subsets. Each subset may contain one or more number of layers. The UE then calculates the required number of spatial beams per layer ($U^{(l)}$) based on any performance enhancement/feedback reduction criterion. The assigned number of spatial beams per layer may then be reported to the gNB.

Reporting of Combining Coefficients

As explained above, each of the $2U^{(l)}$ beams of the CSI matrix is associated with only a small number of channel delays. Moreover, as each beam may point to a different direction in the channel, each beam may only be associated with a small number of delays/delay vectors from the selected $D^{(l)}$-sized basis delay vector subset. This means the power of the combining coefficients of a beam may be concentrated at few delays such that some of the combining coefficients may have close to zero amplitude values. Since the close to zero-valued combining coefficients do not significantly affect the performance, the UE may be configured to indicate those coefficients in the CSI report and may not report them. The following embodiments provide proposals for the combining coefficient selection, indication and reporting in the CSI report.

In accordance with an embodiment, the UE is configured to select $K^{(l)}$ or less than $K^{(l)}$ non-zero combining coefficients for the l-th layer of the CSI matrix, to report the selected non-zero combining coefficients for all layers of the CSI matrix, and to indicate the selected combining coefficients in the CSI report. The selected non-zero coefficients for the l-th layer may be indicated by a $2U^{(l)} \times D^{(l)}$-sized bitmap, where each bit in the bitmap is associated with a polarization index ($p \in \{1,2\}$), beam index ($0 \le u \le U^{(l)}-1$) and delay index ($0 \le d \le D^{(l)}-1$). A "1" in the bitmap may indicate that the combining coefficient associated with the polarization index p, beam index u, and delay index d is non-zero, selected and reported by the UE. A "0" in the bitmap may indicate that the combining coefficient associated with the polarization index p, beam index u, and delay index d is zero and not reported by the UE.

In accordance with an embodiment, the UE may be configured by the gNB with the higher layer parameter(s) $K^{(l)}$, representing the maximum number of non-zero coefficients the UE reports for the l-th layer of the CSI matrix. The UE may be configured with different or identical $K^{(l)}$ per layer, or per layer-group (i.e., a subset of layers).

In the following, some examples for the parameter configuration $K^{(l)}$ are presented.

In one example, the parameter $K^{(0)}$ is configured for the first layer, and the parameters $K^{(l)}$, $l>0$ for the higher layers are derived by the UE by e.g. a known rule. For example, for RI=1, the UE is configured by the gNB with $K^{(0)}$ and for RI=2, $K^{(1)}=K^{(0)}$. In another example, the UE is configured by a single parameter K that denotes the total number of non-zero coefficients across all layers. The UE is then configured to assign the number of non-zero coefficients per layer such that $\Sigma_{l=0}^{RI-1} K^{(l)} \le K$ and is further configured to report the number of non-zero coefficients per layer or the total number of non-zero coefficients across all layers to the gNB. For instance, for RI=1, the UE may be configured with a single parameter K and the UE assigns $K^{(0)} \le K$ coefficients to layer 1 and reports the same to the gNB.

In another example, for RI>1, the UE is configured by a single parameter $K_1$ that denotes the maximum number of non-zero combining coefficients for each layer. The UE is then configured to assign the number of non-zero coefficients per layer such that $\Sigma_{l=0}^{RI-1} K^{(l)} \le 2K_1$, and is further configured to report the number of non-zero coefficients per layer or the total number of non-zero coefficients across all layers to the gNB.

For instance, for RI=2, the UE may be configured by a single value $K_1=28$ that denotes the maximum number of non-zero combining coefficients for each layer, and the number of reported non-zero combining coefficients calculated by the UE for the first and second layer is given by $K^{(0)}=28$ and $K^{(1)}=28$, respectively.

For instance, for RI=3, the UE may be configured by a single value $K_1=42$ that denotes the maximum number of non-zero combining coefficients for each layer, and the number of reported non-zero combining coefficients calculated by the UE for the first, second and third layer is given by $K^{(0)}=42$, $K^{(1)}=28$, and $K^{(2)}=12$, respectively.

For instance, for RI=4, the UE may be configured by a single value $K_1=42$ that denotes a maximum number of non-zero coefficients for each layer, and the number of reported non-zero combining coefficients calculated by the UE for the first, second, third and fourth layers is given by $K^{(0)}=32$, $K^{(1)}=28$, $K^{(2)}=14$, and $K^{(3)}=10$, respectively.

In another example, for RI>1, the UE is configured by a single parameter $K_2$, based on which the UE is configured to assign the number of non-zero combining coefficients per layer such that $\Sigma_{l=0}^{RI-1} K^{(l)} \le 2K_2$, and is further configured to report the number of non-zero combining coefficients per layer or the total number of non-zero coefficients across all layers to the gNB.

In another example, for RI>1, the UE is configured by a single parameter $K_2$, where the number of non-zero combining coefficients per layer can be greater than $K_2$, and based on which the UE is configured to assign the number of non-zero combining coefficients per layer such that $\Sigma_{l=0}^{RI-1} K^{(l)} \le 2K_2$, and is further configured to report the number of non-zero combining coefficients per layer or the total number of non-zero combining coefficients across all layers to the gNB.

For instance, for RI=2, the UE may be configured by a single value $K_2=28$, and the number of reported non-zero combining coefficients calculated by the UE for the first and second layers is given by $K^{(0)}=32$ and $K^{(1)}=24$, respectively.

For instance, for RI=3, the UE may be configured by a single value $K_2=28$, and the number of reported non-zero combining coefficients calculated by the UE for the first, second and third layer is given by $K^{(0)}=30$, $K^{(1)}=16$, and $K^{(2)}=8$, respectively.

For instance, for RI=4, the UE may be configured by a single value $K_1=28$ and the number of non-zero combining coefficients calculated at the UE for the first, second, third and fourth layers is given by $K^{(0)}=30$ $K^{(1)}=10$, $K^{(2)}=9$, and $K^{(3)}=6$, respectively.

Reporting of Bitmap(s)

In accordance with embodiments, a UE may be configured to use a two-step approach to reduce the overall overhead for reporting the bitmaps of all layers. In a first step, the UE may be configured to determine a joint bitmap of size $U_g \times D_g$ by the union of the individual bitmaps across the layers, where $U_g=\max(2U^{(l)})$, $\forall l$ and $D_g=\max(D^{(l)}, \forall l$.

The joint bitmap may consist of $Q_g$ '1's, where a "1" in the joint bitmap represents an index of a reported non-zero coefficient in at least one or more of the individual bitmaps of the layers. In a second step, the UE may report an indication of the indices of the selected non-zero combining coefficients associated with the joint bitmap. Different alternatives for the second step reporting are presented in the following.

In one example, the UE reports a $Q_g$-sized bitmap per layer. Each bit of the $Q_g$-sized bitmap indicates an index of a reported non-zero combining coefficient for the layer in CSI part 2.

In another example, the UE reports a $Q_g^{(l)}$-sized bitmap per layer, where $Q_g^{(l)}$ denotes the number of 1's in the first $D^{(l)}$ columns and the first $U^{(l)}$ rows of the joint bitmap. Each bit of the $Q_g^{(l)}$-sized bitmap indicates an index of a reported non-zero combining coefficient for the layer in CSI part 2.

In another example, the UE reports a $$\left\lceil \log_2\binom{Q_g^{(l)}}{NZ_l} \right\rceil$$

bit indicator per layer that indicates the indices of the reported non-zero combining coefficients for the layer.

In another example, the UE reports a $$\left\lceil \log_2\binom{Q_g}{NZ_l} \right\rceil$$

bit indicator per layer that indicates the indices of the reported non-zero combining coefficients for the layer.

In another example, the UE reports a $$\max_l \left\lceil \log_2\binom{Q_g^{(l)}}{NZ_l} \right\rceil$$

bit indicator per layer that indicates the indices of the reported non-zero combining coefficients for the layer.

In another example, the UE reports a $$\max_l \left\lceil \log_2\binom{Q_g}{NZ_l} \right\rceil$$

bit indicator per layer that indicates the indices of the reported non-zero combining coefficients for the layer.

In accordance with an embodiment, the UE may be configured to report the number of '1's in the joint bitmap, i.e., the value of $Q_g^{(l)}$ per layer, or layer group, in UCI part 1. In one example, $D^{(l)}=D$, $\forall l$, then $Q_g^{(l)}=Q_g$ and only a single value is reported in UCI part 1. In another example, $D^{(1)}=D^{(0)}=D_1$ and $D^{(3)}=D^{(2)}=D_2$, then $Q_g^{(1)}=Q_g^{(0)}$ and $Q_g^{(3)}=Q_g^{(2)}$ and two values are reported in UCI part 1.

In accordance with embodiments, the UE is configured to indicate the size of the second step bitmap(s), or the second step combinatorial bit indicator(s) in UCI part 1.

In the case of reporting $Q_g$-sized bitmap(s) in UCI part 2, the value of $Q_g$ may be indicated (e.g., by a $\lceil \log_2(Q_g \times D_g) \rceil$ bit indicator) in UCI part 1.

In the case of reporting $$\left\lceil \log_2\binom{Q_g}{NZ_l} \right\rceil$$

bit indicator(s) in UCI part 2, the size(s) of the $$\left\lceil \log_2\binom{Q_g}{NZ_l} \right\rceil$$

bit indicator(s) (e.g., the value of $Q_g$) may be indicated in UCI part 1.

In the case of reporting $$\max_l \left\lceil \log_2\binom{Q_g^{(l)}}{NZ_l} \right\rceil, \text{ or } \max_l \left\lceil \log_2\binom{Q_g}{NZ_l} \right\rceil$$

bit indicator(s) in UCI part 2, the size of $$\max_l \left\lceil \log_2\binom{Q_g^{(l)}}{NZ_l} \right\rceil \text{ or } \max_l \left\lceil \log_2\binom{Q_q}{NZ_l} \right\rceil$$

may be indicated in UCI part 1.

In the case of reporting $Q_g^{(l)}$-sized bitmap(s) in UCI part 2, the size(s) of the bitmap(s) per layer, or layer group, are indicated in UCI part 1. For example, $D^{(l)}=D$, $\forall l$, then $Q_g^{(l)}=Q_g$, and only a single value is reported that indicates the size of the second step bitmap(s) in UCI part 1. In another example, $D^{(1)}=D^{(0)}=D_1$ and $D^{(3)}=D^{(2)}=D_2$, then $Q_g^{(1)}=Q_g^{(0)}$, and $Q_g^{(3)}=Q_g^{(2)}$, and the values $Q_g^{(0)}$ and $Q_g^{(2)}$ are indicated (e.g., by a $\lceil \log_2(2U^{(0)} \times (D^{(0)}+D^{(2)})) \rceil$ bit indicator) in UCI part 1.

Similarly, in the case of reporting $$\left\lceil \log_2\binom{Q_g^{(l)}}{NZ_l} \right\rceil$$

bit indicators, the size(s) of the bit indicators per layer, or layer group, are indicated in UCI part 1.

In accordance with an embodiment, the UE may be configured to use a two-step approach to reduce the overall overhead for reporting of the bitmaps of the layers. In a first step, the UE may determine a joint bitmap of size $U_m \times D_m$ by the union of the individual bitmaps across the layers, where $U_m \leq 2U^{(l)}$, $\forall l$ and $D_m \leq D^{(l)}$, $\forall l$. A "1" in the joint bitmap represents a non-zero coefficient in at least one or more of the bitmaps of the individual layers. In a second step, the UE may report an indication of the indices of the selected non-zero combining coefficients associated with the joint bitmap. Different alternatives for the second step reporting are presented in the following.

In one example, the UE reports a $$\max_l \left\lceil \log_2\binom{U_m D_m}{NZ_l} \right\rceil$$

bit indicator for the l-th layer, where $NZ_l$ denotes the number of non-zero combining coefficients of the l-th layer. In another example, the UE reports a $U_m D_m$-sized bitmap per layer, where each bit of the $U_m D_m$-sized bitmap indicates an index of a reported non-zero combining coefficient for the layer in CSI part 2.

In accordance with an embodiment, the UE may be configured to report the size of the joint bitmap in UCI part 1.

In accordance with an embodiment, the size of $$\max_l \left\lceil \log_2\binom{U_m D_m}{NZ_l} \right\rceil$$

bit indicator may be indicated in UCI part 1.

In accordance with an embodiment, the UE may be configured to report in UCI part 2, an indication of the selected SD and (or) FD basis vectors associated with the joint bitmap. For example, the SD basis vectors associated with the joint bitmap are indicated by a $$\max_{l} 2U^{(l)}$$

sized bitmap, where each bit in the bitmap is associated with an index of a reported SD basis vector. Therefore, the $$\max_{l} 2U^{(l)}$$

sized bitmap contains $U_m$ '1's. Similarly, the Frequency Domain (FD) basis vectors associated with the joint bitmap are indicated by a $$\max_{l} D^{(l)}$$

bitmap, where each bit in the bitmap is associated with an index of a reported FD basis vector. Therefore, the $$\max_{l} D^{(l)}$$

bitmap contains $D_m$ '1's.

In accordance with an embodiment, the UE may be configured to reduce the overall overhead for reporting of the bitmaps of the layers. The UE may be configured to determine per layer an effective bitmap of size $U_e^{(l)} \times D_e^{(l)}$, where $U_e^{(l)} \leq 2U^{(l)}$ and $D_e^{(l)} \leq D^{(l)}$. The effective bitmaps are reported in CSI part 2. Each effective bitmap contains only non-zero rows and/or non-zero columns.

Moreover, the UE is configured to indicate in the CSI part 2, an indication of the selected SD basis vectors associated with the effective bitmap per layer and/or an indication of the selected FD basis vectors associated with the effective bitmap per layer. For example, the indication of the Spatial Domain (SD) basis vectors associated with the effective bitmap for a layer is indicated by a $2U^{(l)}$-sized bitmap, and may consist of $U_e^{(l)}$ '1's. Similarly, the FD basis associated with the effective bitmap per layer is reported by $D^{(l)}$-sized bitmap, and may consist of $D_e^{(l)}$ '1's.

In accordance to an embodiment, the UE is configured to indicate the sizes of the effective bitmaps for all layers in UCI part 1. As an example, the sizes of the effective bitmaps may be represented by a $\lceil \log_2 \Sigma_{l=0}^{RI-1} U_e^{(l)} \times D_e^{(l)} \rceil$ bit indicator.

In accordance to an embodiment, the UE is configured to indicate the number of '1's in the $2U^{(l)}$-sized bitmap across all layers (e.g., by a $\lceil \log_2 (2\Sigma_l U^{(l)}) \rceil$ bit indicator), indicating the selected SD basis vectors, in UCI part 1.

In accordance to an embodiment, the UE is configured to indicate the number of O's in the $2U^{(l)}$-sized bitmap across all layers, indicating the non-selected SD basis vectors, in UCI part 1.

In accordance to an embodiment, the UE is configured to indicate the number of 1's in the DM-sized bitmaps across all layers (e.g., by a $\lceil \log_2 (\Sigma_l D^{(l)}) \rceil$ bit indicator), indicating the selected FD basis vectors, in UCI part 1.

In accordance to an embodiment, the UE is configured to indicate the number of O's in the DM-sized bitmaps across all layers (e.g., by a $\lceil \log_2 (\Sigma_l D^{(l)}) \rceil$ bit indicator), indicating the non-selected FD basis vectors, in UCI part 1.

In accordance with an embodiment, when the configured values of $K^{(l)}$ or K is small, the non-zero combining coefficients to be reported for a layer may only be associated with a single polarization. In such a case, one part of the bitmap of size $U^{(l)} \times D^{(l)}$ associated with a specific polarization and layer may contain only zeros.

To reduce the feedback overhead for reporting the bitmap(s) for the layers in such a case, the UE may be configured to report a layer indicator in UCI part 1 for which one part of the bitmap of size $U^{(l)} \times D^{(l)}$ associated with a specific polarization and layer contains only zeros. For example, the layer indicator may consist of 4 bits (for a maximum RI of 4), where each bit is associated with a specific layer.

When a bit of the layer indicator is set to '0', it may indicate that the corresponding bitmap associated with the specific layer is reported.

When a bit of the layer indicator is set to '1', it may indicate that only half of the bitmap associated with the layer is reported.

In order to indicate the polarization index associated with the reported bitmap, the UCI part 2 may contain for each layer, where the number of reported non-zero combining coefficients is zero for a specific polarization, a polarization indicator indicating the polarization of the reported non-zero combining coefficients. The polarization indicator may consist of N bits, where N indicates the number of indicated by the layer indicator. For example, when the layer indicator is given by '1010', it indicates that the number of non-zero combining coefficients for a specific polarization is zero and only half of the bitmap may be reported for the first and third layer. The polarization indicator may be given by '01' indicating that for the first layer the reported non-zero combining coefficients and part of the bitmap are associated with the first polarization and for the third layer the reported non-zero combining coefficients and part of the bitmap are associated with the second polarization.

In accordance with an embodiment, the UE may be configured to report a layer indicator in UCI part 1 only for a subset of layers for which one part of the bitmap of size $U^{(l)} \times D^{(l)}$ associated with a specific polarization and layer contains only zeros. For example, the layer indicator may only consist of 2 bits, where the first and second bit is associated with the third layer and fourth layer, respectively. In order to indicate the polarization index associated with the reported bitmap, the UCI part 2 may contain for each layer from the subset of layers, where the number of reported non-zero combining coefficients is zero for a specific polarization, a polarization indicator indicating the polarization of the reported non-zero combining coefficients.

In accordance with an embodiment, the UE is configured to indicate the selected number of non-zero combining coefficients per layer or the selected number of non-zero coefficients over all layers in the CSI report.

CSI Report Part 1 and Part 2

In accordance with an embodiment, the CSI report may comprise two parts, where the first part has a fixed size and is used to indicate the size of the payload of the second part. The two CSI parts are independently encoded. The second CSI part has a varying payload size and may contain at least the SD basis subset indicator(s), the DD basis subset indicator(s), the one or multiple bitmaps for the non-zero coefficient indication and the quantized combining coefficients for all layers.

In order to indicate the payload size of the CSI part 2, the CSI part 1 may contain the information on the number of quantized combining coefficients across all layers in CSI part 1 and the rank of the CSI matrix.

Reporting Number of Non-Zero Combining Coefficients

In an example, the CSI part 1 may contain the selected number of non-zero combining coefficients (NNZCC) for each of the RI layers. For a maximum of RI=4, the CSI part 1 may contain four NNZCC bit-indicators for the four different layers.

As an example, each NNZCC bit-indicator is represented by a $$\max_l \lceil \log_2(g^{(l)}+1) \rceil \text{ or } \max_l \lceil \log_2(g^{(l)}) \rceil \text{ or } \lceil \log_2 g^{(l)} \rceil \text{ or } \lceil \log_2(g^{(l)}+1) \rceil$$

bit indicator, where $g^{(l)}$ represents the maximum number of reported coefficients for the l-th layer. In one instance, $g^{(l)}=K_0$ for all layers. In another instance, $g^{(l)}=2K_0$ for all layers. Here, $K_0$ refers to the number of non-zero combining coefficients that are higher-layer configured. In another example, each NNZCC bit-indicator is represented by a $\lceil \log_2(2U^{(l)}D^{(l)}) \rceil$ bit indicator. As the NNZCC is indicated per layer, the number of non-zero values of the NNZCC bit indicators implicitly indicate the RI of the CSI matrix (i.e., total number of layers). The rank (parameter RI) may therefore be removed from the CSI report (i.e., not reported).

In another example, the CSI part 1 may contain the sum of the selected NNZCC across all layers and hence it contains a single NNZCC bit-indicator for the different layers. As an example, the NNZCC bit-indicator is represented by a $\lceil \log_2 g \rceil$ indicator, where g represents the maximum number of reported comining coefficients across all layers.

In one instance $g=K_0$. In another instance, $g=2K_0$. In another instance, $g=\Sigma_{l=0}^{RI-1} 2U^{(l)}D^{(l)}$ for the l-th layer. Since the value of the NNZCC bit indicator does not indicate the RI of the CSI matrix, the rank (parameter RI) may be contained in the CSI report.

Reporting of Strongest Coefficient Indicator (SCI)

In accordance with an embodiment, the UE is configured to normalize the combining coefficients to be reported per layer with respect to the strongest coefficient, such that the normalized strongest coefficient is given by the value 1. Since the normalized strongest coefficient is always given by the same value, the UE is configured not to report the strongest coefficient (bit values for the amplitude and phase of the quantized coefficient) and to indicate per layer the strongest coefficient by a strongest coefficient indicator in the CSI report (part 2). The structure of the strongest coefficient indicator depends on the structure of the NNZCC bit indicators in CSI part 1. In the following different alternatives are discussed.

In an example, the strongest coefficient indicator associated with l-th layer is given by a $\lceil \log_2(NZ_l) \rceil$ or a $$\max_l \lceil \log_2(NZ_l) \rceil$$

bit indicator, and the CSI part 1 contains the selected number of non-zero combining coefficients (NNZCC) for each of the RI layers. Here, $NZ_l$ represents the NNZCC indicated for the l-th layer in CSI part 1.

In an example, the strongest coefficient indicator associated with l-th layer is given by a $\lceil \log_2(K^{(l)}) \rceil$ or a $$\max_l \lceil \log_2(K^{(l)}) \rceil$$

bit indicator. Here $K^{(l)}$ represents the maximum NNZCC configured per layer.

In another example, the strongest coefficient indicator associated with the l-th layer is given by a $\lceil \log_2(\Sigma_{l=0}^{RI-1} NZ_l) \rceil$-bit indicator, and the CSI part 1 contains the selected number of non-zero combining coefficients (NNZCC) across all layers.

In another example, the strongest coefficient indicator associated with l-th layer is given by a $\lceil \log_2(2K_2) \rceil$ bit indicator, where $K_2$ is the NNZCC configured to the UE. In another example, the strongest coefficient indicator associated with l-th layer is given by a $\lceil \log_2(K_1) \rceil$ bit indicator, where the maximum NNZCC to be reported is restricted to $K_1$ per layer.

In another example, the strongest coefficient indicator for all RI layers is jointly reported, by the UE, and represented by a $$\left\lceil \log_2 \left( \begin{array}{c} \sum_{l=0}^{RI-1} NZ_l \\ RI \end{array} \right) \right\rceil$$

bit indicator. This bit indication along with the bitmap in UCI part 2 is used to identify the strongest combining coefficients per layer.

Reporting of DD Basis Subset Indicator(s)

In accordance with an embodiment, the UE is configured to report the DD basis subset indicator(s) indicating the selected delay vectors from the second codebook for each layer of the CSI matrix in part 2 of the CSI report. In an example, the DD basis subset indicator for each layer is given by a $N_3$-sized bitmap, where each bit in the bitmap is associated with a delay vector from the second codebook.

A "1" may indicate that the associated delay vector is selected, and a "0" may indicate that the associated delay vector is not selected. In another example, the DD basis subset indicator for the l-th layer is given by a $$\left\lceil \log_2 \binom{N_3}{D^{(l)}} \right\rceil$$

bit indicator.

In the following exemplary embodiments, different reporting schemes for the DD basis subset indicators that reduce the feedback overhead of the CSI report are presented.

In accordance with an embodiment, the UE is configured to determine a common delay domain (CDD) basis subset of the selected delay vectors across all layers, and to indicate the delay vectors of the CDD basis subset by a CDD basis subset indicator in the CSI report. Furthermore, the UE may be configured to indicate the selected delay vectors from the CDD basis subset for each layer by a layer-specific delay domain basis (LDD) subset indicator in the CSI report.

In an example, the CDD basis subset indicator is given by a $N_3$-sized bitmap, where the bitmap contains $\overline{D}$ 1's and each bit in the bitmap is associated with a delay vector from the second codebook.

A "1" may indicate that the associated delay vector is selected, and a "0" may indicate that the associated delay vector is not selected.

In another example, the CDD basis subset indicator is given by a $$\left\lceil \log_2 \binom{N_3}{\overline{D}} \right\rceil$$

bit indicator, where $\overline{D} < N_3$ indicates the total number of selected delay vectors by the UE across all layers.

In another example, the CDD basis subset indicator is represented by two values $\overline{D}$ and $\overline{D}_{in}$, where $\overline{D}$ defines the number of elements of the CDD basis subset, and $\overline{D}_{in}$ represents the first index of the selected $\overline{D}$ delay vectors $[d_{mod(\overline{D}_{in},N_3)}, d_{mod(\overline{D}_{in}+1,N_3)}, \ldots, d_{mod(\overline{D}_{in}+\overline{D}-1,N_3)}]$ from the second codebook.

Examples of the CDD basis subset configured by $\overline{D}$ and $\overline{D}_{in}$ are shown in FIGS. 1A and 1B.

FIG. 1A illustrates an example of a CDD basis subset for the values: $N_3=13$, $\overline{D}=7$ and $\overline{D}_{in}=12$.

The CDD basis subset contains $\overline{D}=7$ FD basis vectors $[d_{mod(\overline{D}_{in},N_3)}, d_{mod(\overline{D}_{in}+1,N_3)}, \ldots, d_{mod(\overline{D}_{in}+\overline{D}-1,N_3)}]=[d_{12},d_{13},d_1,d_2,d_3,d_4,d_5]$, selected from the second codebook of size $N_3=13$. The index of the first FD vector of the CDD subset is given by $\overline{D}_{in}=12$.

FIG. 1B illustrates another example of a CDD basis subset for the values: $N_3=13$, $\overline{D}=8$ and $\overline{D}_{in}=9$.

The CDD basis subset contains $\overline{D}=8$ FD basis vectors $[d_{mod(\overline{D}_{in},N_3)}, d_{mod(\overline{D}_{in}+1,N_3)}, \ldots, d_{mod(\overline{D}_{in}+\overline{D}-1,N_3)}]=[d_9,d_{10},d_{11},d_{12},d_{13},d_1,d_2,d_3]$, selected from the second codebook of size $N_3=13$. The index of the first FD vector of the CDD subset is given by $\overline{D}_{in}=9$.

In an example, the LDD subset indicator is given by a $\overline{D}$-sized bitmap and each bit in the bitmap is associated with a delay vector from the CDD basis subset. A "1" may indicate that the associated delay vector is selected from the CDD basis subset, and a "0" may indicate that the associated delay vector is not selected from the CDD basis subset. In another example, the LDD subset indicator is given by a $$\left\lceil \log_2 \binom{\overline{D}}{D^{(l)}} \right\rceil$$

bit indicator.

In accordance with an embodiment, for the indication of the payload size of the CDD basis subset indicator in the CSI report part 2, the UE is configured to report the parameter $\overline{D}$ in CSI report part 1. Furthermore, the UE is configured to report (if available) the parameter $\overline{D}_{in}$ in CSI part 2.

In accordance with an embodiment, for reducing the feedback overhead of the CSI report part 1, the UE is configured with the parameter $\overline{D}$ by the gNB (and hence not reported in CSI part 1), or the parameter $\overline{D}$ is a priori known at the UE (and hence not reported in CSI part 1).

In accordance with an embodiment, for reducing the feedback overhead of the CSI report part 1, the UE is configured with the parameter(s) $\overline{D}_r$ by the gNB for each possible rank RI of the CSI matrix (and hence not to report the parameter $\overline{D}_r$ in CSI part 1), or the parameter(s) $\overline{D}_r$ are e.g. a priori known at the UE (and hence not reported).

In accordance with an embodiment, for reducing the feedback overhead of the CSI report part 1, the UE is configured with the parameter(s) $\overline{D}_{in,r}$ by the gNB for each possible rank RI of the CSI matrix (and hence not to report the parameter $\overline{D}_{in,r}$ in CSI part 2), or the parameter(s) $\overline{D}_{in,r}$ are a priori known at the UE (and hence not reported). In an example, $$\overline{D}_{in,r} = N_3 - \left\lceil \frac{N_3'}{2} \right\rceil + q,$$

where $q \in \{1,2,\ldots\}$ is an integer.

In accordance with an embodiment, for reducing the feedback overhead of the CSI report (part 1 and part 2), the UE is configured to receive the CDD basis subset indicator from the gNB, and not to report the CDD basis subset indicator in CSI part 2. The CDD basis subset indicator configured by the gNB may be rank-specific, and the gNB configures for each rank $RI \in \{1,2,3,4\}$ of the CSI matrix a CDD basis subset indicator.

In an example, the CDD basis subset indicator configured by the gNB is given by a $N_3$-sized bitmap, where the bitmap contains $\overline{D}$ 1's and each bit in the bitmap is associated with a delay vector from the second codebook.

A "1" may indicate that the associated delay vector is selected, and a "0" may indicate that the associated delay vector is not selected. In another example, the CDD basis subset indicator is configured by a $$\left\lceil \log_2 \binom{N_3}{\overline{D}} \right\rceil$$

bit indicator, where the parameter $\overline{D}$ indicates the total number of selected delay vectors by the UE across all layers and is configured by the gNB.

In accordance with an embodiment, for reducing the feedback overhead of the CSI report (part 1 and part 2), the UE is configured to select the delay vectors for each layer from an a-priori known CDD basis subset indicator (e.g. known by 3GPP standard specification), and not to report the CDD basis subset indicator in CSI part 2.

In accordance with an embodiment, for reducing the feedback overhead of the CSI report (part 2), the UE is configured to select the CDD basis subset indicator from a-priori known multiple CDD basis subsets of different sizes and to indicate in the CSI part 1 the size of the selected CDD basis subset. The CDD basis subset indicator sets are either higher layer configured or known at the UE (defined by specification).

In accordance with an embodiment, for reducing the feedback overhead of the CSI report (part 1 and part 2), the UE is configured to select the CDD basis subset indicator from a-priori known N equal-sized CDD basis subset indicator set(s), and to indicate in the CSI report part 2 the selected CDD basis subset and in the CSI part 1 the size of the selected CDD basis subset. As an example, the selected CDD basis subset indicator in CSI part 2 may be represented by a $\lceil \log_2 N \rceil$ bit indicator.

In accordance with an embodiment, the UE is configured to perform a $N_3$-modulo shift operation on all delay indices of the vectors in the selected DD basis subset of a layer with respect to the delay index associated with the strongest coefficient indicator of the layer. Note that this shift operation has no impact on the performance of the precoder defined by the CSI matrix and the shifted DD basis subset. After this shift operation is applied, the delay index associated with the strongest coefficient is always associated with a known delay index, for example, the first delay index.

Consequently, the first delay index does not need to be reported and the DD basis subset indicator for the l-th layer is given by ($N_3$−1) sized bitmap, a $$\left\lceil \log_2 \binom{N_3}{D^{(l)}-1} \right\rceil$$

bit indicator, or a $$\left\lceil \log_2 \binom{N_3-1}{D^{(l)}-1} \right\rceil$$

bit indicator. Furthermore, as the strongest coefficient is always be associated with the first delay, the strongest coefficient indicator may then be represented by a $\lceil \log_2 (2U^{(l)}) \rceil$ bit indicator to indicate the row of the bitmap associated with the strongest coefficient.

In accordance with an embodiment, the UE is configured to perform a D-modulo shift operation on all delay indices of the vectors in the selected LDD basis subset with respect to the delay index associated with the strongest coefficient of the layer. Note that, similar to above, this shift operation has no impact on the performance of the precoder defined by the CSI matrix and the shifted LDD basis subset(s). After this shift operation is applied, the delay index associated with the strongest coefficient is always associated with the first delay index.

Consequently, the first delay index does not need to be reported and the LDD basis subset indicator for the l-th Layer is given by ($\overline{D}$−1)-sized bitmap, or a $$\left\lceil \log_2 \binom{\overline{D}}{D^{(l)}-1} \right\rceil$$

bit indicator, or a $$\left\lceil \log_2 \binom{\overline{D}-1}{D^{(l)}-1} \right\rceil$$

bit indicator. Similarly, the CDD basis subset indicator may be represented by a $$\left\lceil \log_2 \binom{N_3}{\overline{D}-1} \right\rceil$$

bit indicator, or a $$\left\lceil \log_2 \binom{N_3-1}{\overline{D}-1} \right\rceil$$

bit indicator.

Reporting of D'

In accordance to an embodiment, in order to further save the feedback overhead, the UE may report a value $D^{(l)'}$ ($\leq D^{(l)}$) in UCI part 1 indicating that the associated bitmap of the l-th layer contains only $D^{(l)'}$ columns, instead of $D^{(l)}$ columns.

For example, if the configured value of $D^{(l)}$=7, and the last 2 columns of the bitmap associated with the l-th layer contains only zeros, the part of the bitmap containing only zeros is dropped from UCI part 2, In this way, the size of the bitmap is reduced from $2U^{(l)} \times D^{(l)}$ to $2U^{(l)} \times D^{(l)'}$ and a feedback overhead saving is achieved. The value $D^{(l)'}$ may be indicated in UCI part 1.

In one example, $D^{(l)'}$ may be indicated by the UE by a 1-bit indicator per layer. Then, $D^{(l)'}$ may be restricted to $D^{(l)'}=\gamma D^{(l)}$, where $\gamma \in (0,1)$. Examples of $\gamma$ are given by $\gamma=\{½,¾\}$. When the 1-bit indicator is set, $D^{(l)'}=D^{(l)}$, otherwise, $D^{(l)'}=\gamma D^{(l)}$.

In another example, $D^{(l)'}$ may be indicated by the UE by a 1-bit indicator for all layers. When the 1-bit indicator is set, $D^{(l)'}=D^{(l)}$ for all layers, otherwise, $D^{(l)'}=\gamma D^{(l)}$ for all layers.

In accordance to an embodiment, the selected $D^{(l)'}$ may be indicated by the UE by unused code-points of other UCI 1 parameters. For example, the code-points used for the indication of the number of non-zero combining coefficients may be used to report in addition the 1-bit indicator for all layers. For instance, when $K_0$=42, the total number of non-zero combining coefficients across all four layers is given by 84, and 7 bits are used to indicate the number of non-zero combining coefficients. Out of the 128 code-points, 46 code-points are un-used and can be used for the indication of the selected value of $D^{(l)'}$. Different examples are provided in the following. In one instance, the code-points 1 to 84 indicate the selected number of non-zero combining coefficients and indicate that $D^{(l)'}=D^{(l)}$ for all layers, and the remaining codepoints 85 to 128 indicate the selected numbers of non-zero combining coefficients 1 to 44, and that $D^{(l)'}=\gamma D^{(l)}$ for all layers. In another instance, the code-points 1 to 84 indicate the selected number of non-zero combining coefficients and indicate that $D^{(l)'}=D^{(l)}$ for all layers, and the remaining codepoints 85 to 128 indicate the selected numbers of non-zero combining coefficients 1,3,5 to 83, and that $D^{(l)'}=\gamma D^{(l)}$ for all layers. In another instance, the code-points 1 to 84 indicate the selected number of non-zero combining coefficients and indicate that $D^{(l)'}=D^{(l)}$ for all layers, and the remaining codepoints 85 to 128 indicate the selected numbers of non-zero combining coefficients 2,4,6 to 84, and that $D^{(l)'}=\gamma D^{(l)}$ for all layers.

Basis Sufficiency Indication

In accordance with an embodiment, the UE may be configured to report a FD basis sufficiency indicator in the CSI report, the FD basis sufficiency indicator indicates whether the configuration of the values K (or $K_1$ or $K_2$ or $K^{(l)}$) or $D^{(l)}$ or ($D^{(l,r)}$) or $N_3$ is sufficient to calculate the CSI matrix.

When a delay spread of the propagation channel is large and the configured value of $N_3$ is too small, the calculation of the CSI matrix is influenced by aliasing. Also, when the configured values of K (or $K_1$ or $K_2$ or $K^{(l)}$ or $D^{(l)}$ or ($D^{(l,r)}$) may be too small, the UE may not be able to calculate the CSI matrix.

In the following, examples for the FD basis sufficiency indicator are presented.

In an example, the UE may be configured to report the basis sufficiency indicator explicitly in UCI part 1. For instance, the UE may be configured to explicitly indicate the basis sufficiency indicator using a 1-bit indicator in UCI part 1.

A '1' of the bit indicator may indicate that the configured values K (or $K_1$ or $K_2$ or $K^{(l)}$ and/or $D^{(l)}$ or ($D^{(l,r)}$) are sufficient, and a '0' may indicate that the values K (or $K_1$ or $K_2$ or $K^{(l)}$) and/or $D^{(l)}$ or ($D^{(l,r)}$) are not sufficient.

In another example, the UE may be configured to implicitly indicate the basis sufficiency indication by reporting a zero for the NNZCC in UCI part 1.

In another example, the UE may be configured to implicitly indicate the basis sufficiency indication by reporting a value of two for the NNZCC in UCI part 1.

In accordance with an embodiment, when the UE may be configured to indicate via the basis sufficiency indicator in UCI part 1 that if one of the values of K (or $K_1$ or $K_2$ or $K^{(l)}$ and/or $D^{(l)}$ or $(D^{(l,r)}$ is not sufficient, the UE is configured to drop or partly drop the UCI part 2.

In an example, the UE may be configured to fully drop UCI part 2.

In another example, the UE may be configured to only report the selected SD basis subsets in UCI part 2.

In another example, the UE may be configured to report a selected single SD basis vector along with the selected two non-zero combining coefficients per layer.

In another example, the UE may be configured to report a selected single SD basis vector along with the selected two non-zero combining coefficients only for the first layer.

When the UE indicates a FD basis sufficiency indication in the UCI report, the UE may be configured by the gNB with larger values of K (or $K_1$ or $K_2$ or $K_{(l)}$) and/or $D^{(l)}$ or $(D^{(l,r)}$ or $N_3$ for future CSI reporting.

Reporting of SD Basis Subset Indicator(s)

In accordance with an embodiment, the UE is configured to determine a layer-specific space domain (LSD) basis subset of the selected beam vectors and to indicate the beam vectors in the CSI report (part 2). The LSD basis subset indicator is given by a $$\left\lceil \log_2 \binom{N_1 N_2}{U^{(l)}} \right\rceil$$

bit indicator for the l-th layer. When the UE is configured with a single parameter U, representing the number of beams per layer, the LSD basis subset indicator $$\left\lceil \log_2 \binom{N_1 N_2}{U} \right\rceil$$

is identical across all layers and reported once.

As demonstrated several advantages are achieved by the embodiments herein.

Figure 2:
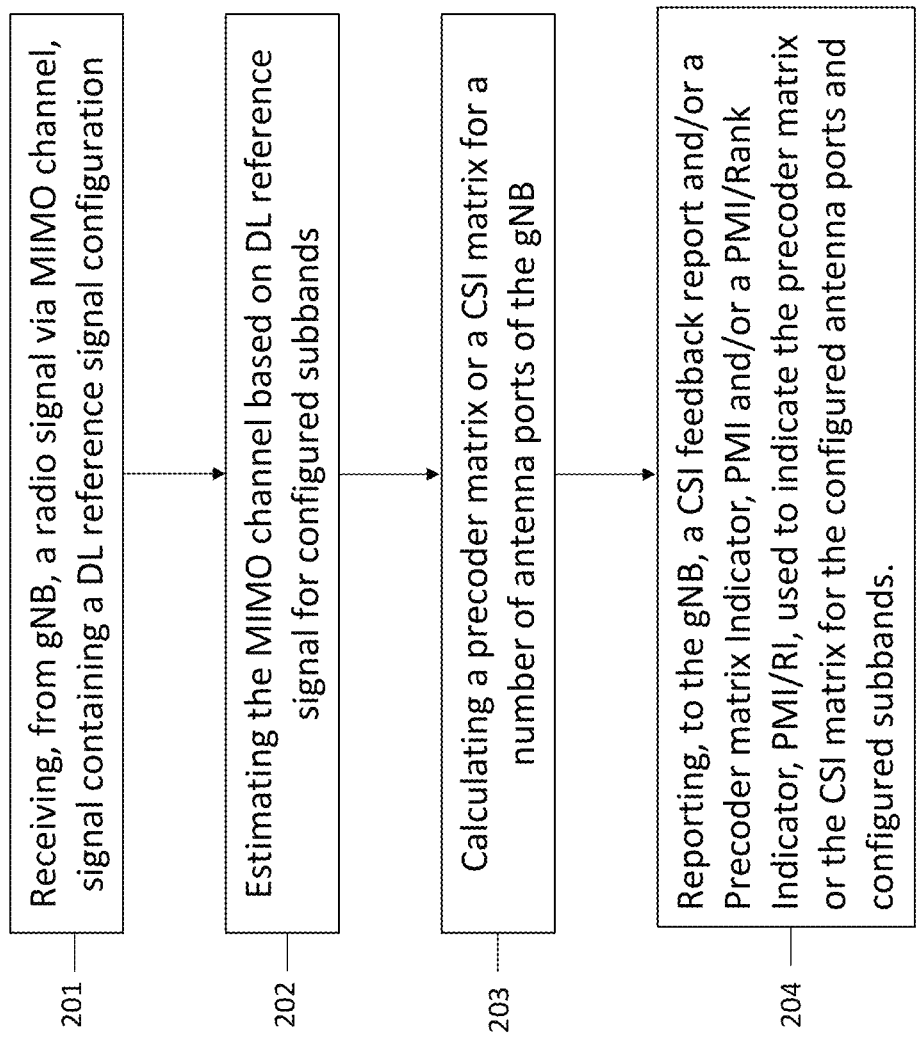
FIG. 2 is a flowchart of a method performed by a UE according to some embodiments herein.

Below is a summary of the method performed by a UE according to the described embodiments and with reference to FIG. 2 depicting a flowchart of a method performed by the UE. As shown, the method performed by the UE comprises:

(201) receiving from a network node, gNB, a radio signal via a MIMO channel, wherein the radio signal contains at least one DL reference signal according to a DL reference signal configuration;

(202) estimating said MIMO channel based on said received at least one DL reference signal for configured subbands;

(203) calculating a precoder matrix or a CSI matrix for a number of antenna ports of the gNB and configured subbands; the precoder matrix being based on a first codebook and on a second codebook and a set of combining coefficients for complex scaling/combining one or more of vectors selected from the first codebook and the second codebook;

where,
the first codebook contains one or more transmit-side spatial beam components of the precoder matrix,
the second codebook contains one or more delay components of the precoder matrix, and (204) reporting, to the gNB, a CSI feedback report and/or a Precoder matrix Indicator, PMI and/or a PMI/Rank Indicator, PMI/RI, used to indicate the precoder matrix or the CSI matrix for the configured antenna ports and subbands.

According to an embodiment, and as previously described, the method comprises receiving a configuration from the gNB, said configuration comprising a CSI report configuration including at least one higher-layer parameters, $D^{(l)}$, representing a number of delays per layer, used for the configuration of the precoder matrix or CSI matrix.

According to an embodiment, the number of delays $D^{(l)}$ is layer-independent and identical for all layers, such that $D^{(l)}=D$, and configuring the UE with only a single parameter D for the configuration of the precoder matrix or CSI matrix.

According to an embodiment, the number of delays $D^{(l)}$ is configured for subsets of layers, e.g., for a first subset of layers, e.g., a first and second layers), $D^{(1)}=[\alpha_1 D^{(0)}]$, and for a second subset of layers, e.g. a third layer or the third layer and a fourth layer), $D^{(3)}=[\alpha_2 D^{(2)}]$, and receiving from the gNB a signal including two parameters $D^{(0)}$ and $D^{(2)}$ for the configuration of the precoder matrix.

The method further comprises receiving a configuration from the gNB, which configuration includes a single parameter $D^{(0)}$ for a first layer, and deriving the parameter(s) $D^{(l)}$, l>0 for the remaining layers.

According to an embodiment, the configuration of delays is dependent on the Rank Indicator (RI) of the precoder matrix or the CSI matrix.

According to another embodiment, the method comprises receiving a configuration from the gNB, said configuration comprising a CSI report configuration including at least one higher-layer parameters, $U^{(l)}$, representing the number of spatial beams for the l-th layer, used for the configuration of the precoder matrix or the CSI matrix. As previously described, the higher layer parameter U is a UE capability; and the method comprises indicating the supported value range for the parameter U to the gNB.

According to an embodiment, for RI>1, the method comprises receiving a configuration from the gNB indicating a single parameter $K_1$ that denotes the maximum number of non-zero combining coefficients for each layer; and assigning by the UE the number of non-zero combining coefficients per layer such that $\Sigma_{l=0}^{RI-1} K^{(l)} \leq 2K_1$, and reporting to the gNB the number of non-zero coefficients per layer or the total number of non-zero combining coefficients across all layers. For RI>1, the method comprises receiving a configuration from the gNB indicating a single parameter $K_2$, based on which the UE assigning the number of non-zero combining coefficients per layer such that $\Sigma_{l=0}^{RI-1} K^{(l)} \leq 2K_2$, and reporting the number of non-zero combining coefficients per layer or the total number of non-zero combining coefficients across all layers to the gNB.

The method may further comprise using a two-step approach to reduce the overall overhead for reporting the bitmaps of all layers, wherein in a first step, the UE determining determine a joint bitmap of size $U_g \times D_g$ by the union of individual bitmaps across the layers, and reporting to the gNB the number of '1's in the joint bitmap, and wherein in a second step, reporting to the gNB an indication of the indices of the selected non-zero combining coefficients associated with the joint bitmap.

The method may further comprise reporting in an UCI (Uplink Control Information) part 2, an indication of selected Spatial Domain, SD, and/or Frequency Domain, FD, basis vectors associated with the joint bitmap.

The method may further comprise determining per layer an effective bitmap of size $U_e^{(l)} \times D_e^{(l)}$, where $U_e^{(l)} \leq 2U^{(l)}$ and $D_e^{(l)} \leq D^{(l)}$, wherein the effective bitmaps are reported in CSI part 2 and wherein each effective bitmap contains only non-zero rows and/or non-zero columns, and indicating in the CSI part 2, an indication of the selected SD basis vectors associated with the effective bitmap per layer and/or an indication of the selected FD basis vectors associated with the effective bitmap per layer.

The method may further comprise indicating the sizes of the effective bitmaps for all layers in UCI part 1.

The method may further comprise determining a Common Delay Domain (CDD) basis subset of selected delay vectors across all layers, and indicating the delay vectors of the CDD basis subset by a CDD basis subset indicator in the CSI report.

The method may further comprise indicating the selected delay vectors from the CDD basis subset for each layer by a layer-specific delay domain basis, LDD, subset indicator in the CSI report.

The method may further comprise performing a $N_3$-modulo shift operation on all delay indices of the vectors in a selected Delay Domain (DD) basis subset of a layer with respect to a delay index associated with the strongest coefficient indicator of the layer.

The following embodiments of the present invention to reduce the UE calculation complexity for calculating the precoder matrix and to reduce feedback overhead are now further described in more detail. It is noted that several embodiments are described in the following, basically, independent of each other, however, the subsequently described embodiments may be implemented individually or in combination with the previously embodiments. In other words, some or all of the described embodiments may be combined unless mutually exclusive.

The embodiments are first presented followed by a detailed description of the different embodiments.

According to an embodiment, the method performed by the UE further comprises selecting and reporting a parameter $\overline{D}_{in}$ representing a first index of the delay vector in the CDD basis subset, such that the first delay vector associated with index 0 is included in the CDD subset.

According to an embodiment, the UE is configured to report the parameter $\overline{D}_{in}$ using a $\lceil \log_2 N_3 \rceil$-bit indicator.

According to an embodiment, the value range of the parameter $\overline{D}_{in}$ is reduced from $N_3$ to $\overline{D}$ values, and is defined by $\overline{D}_{in} = \text{mod}(d_{SCI} - \overline{D} + 1 + n, N_3)$, $n \in [0, \overline{D}-1]$, wherein $d_{SCI}$ is the index of the FD basis vector associated with the SCI, and the UE is configured to report $\overline{D}_{in}$ using a $\lceil \log_2 \overline{D} \rceil$-bit indicator.

According to another embodiment, the value range of the parameter $\overline{D}_{in}$ is reduced from $N_3$ to $\overline{D}$ values, and is defined by $\overline{D}_{in} = \text{mod}(N_3 - \overline{D} + 1 + n, N_3)$, $n \in [0, \overline{D}-1]$, and the UE is configured to report $\overline{D}_{in}$ using a $\lceil \log_2 \overline{D} \rceil$-bit indicator.

According to an embodiment, the value range of the parameter n is reduced from $\overline{D}$ to d' values, and d' is either higher-layer configured or a priori known or determined by the UE for given parameters $N_3$ and/or $\overline{D}$, and the value n is reported by the UE using a $\lceil \log_2 d' \rceil$-bit indicator.

According to yet another embodiment, the value range of the parameter $\overline{D}_{in}$ is reduced from $\overline{D}$ to d' values, wherein the parameter $\overline{D}_{in}$ is defined by $$\overline{D}_{in} = N_3 - \left\lceil \frac{\overline{D}}{2} \right\rceil + q,$$

wherein the value range of $q \in \mathbb{Z}$ is limited to d' values and d' is either higher-layer configured or a priori known or determined by the UE for given parameters $N_3$ and/or $\overline{D}$, and wherein the value q is reported by the UE using a $\lceil \log_2 d' \rceil$-bit indicator.

According to an embodiment, the value range of the parameter q is either higher-layer configured, or fixed and a priori known to the UE or determined by the UE based on the configured $N_3$ and $\overline{D}$ values.

According to an embodiment, each of the d' codepoints is represented by a $\lceil \log_2 d' \rceil$-bit indicator, where the first codepoint is represented by $\lceil \log_2 d' \rceil$-zeros and associated with the smallest integer value in the value range of q, and wherein the remaining values in the pre-defined set of d' values are mapped to codepoints in an increasing order.

According to an embodiment, if the value 0 is contained in the value range of q, the zero value is mapped to the first codepoint, represented by $\lceil \log_2 d' \rceil$-zeros. According to an embodiment, the reporting of the parameter $\overline{D}_{in}$ may be dependent on the transmission rank, and for a low rank transmission, the parameter $\overline{D}_{in}$ may be fixed, hence not reported.

According to an embodiment $\overline{D}_{in}$ may be given by $$\overline{D}_{in} = N_3 - \left\lceil \frac{\overline{D}}{2} \right\rceil + q, q \in \mathbb{Z},$$

where the value of q is a priori known by the UE or higher layer configured and wherein the low transmission rank is in one instance R'=1, or in another instance, R'∈{1,2}.

According to an embodiment, the value of $\overline{D}_{in}$ is reported when the transmission rank is larger than a threshold value.

According to an embodiment, the value of $\overline{D}_{in}$ is reported when the configured value of $\overline{D}$ is smaller than a threshold value.

According to an embodiment, the parameter $\overline{D}$, defining the CDD basis subset size, depends on the transmission rank, wherein the CDD basis subset size increases with increasing transmission rank.

According to another embodiment, the size of the CDD basis subset $\overline{D}$ depends on the configured number of Spatial Domain (SD) basis vectors, where the value of $\overline{D}$ configured for larger number of SD basis vectors is smaller than the value of $\overline{D}$ configured for smaller number of SD basis vectors.

According to another embodiment, the UE is configured to indicate a number of non-zero combining coefficients across all layers, given by $\Sigma_{l=0}^{RI-1} NZ_l$, in CSI part 1 by $\Sigma_{l=0}^{RI-1} NZ_l - RI$.

Below is presented a detailed description of the above described embodiments.

Reporting of DD Basis Subset Indicator(s)

As mentioned earlier, the CDD basis subset is defined by two values $\overline{D}$ and $\overline{D}_{in}$, where $\overline{D}$ denotes the number of elements in the CDD basis subset, and $\overline{D}_{in}$ represents the first index of the selected $\overline{D}$ delay vectors. The indices in the CDD basis subset are continuous and can be calculated from $\overline{D}$, $N_3$ and $\overline{D}_{in}$ as $$\text{mod}(\overline{D}_{in} + n, N_3), n = 0, 1, \ldots, \overline{D}-1$$

In accordance to an embodiment, the common delay domain, CDD, basis subset indicator indicating a common continuous subset of delay vectors across all layers, is defined by the parameter $\overline{D}_{in}$ representing the first index of the delay vector of the CDD basis subset and the parameter $\overline{D}$ representing the number of delay vectors of the CDD basis subset.

Value Range of Parameter $\overline{D}_{in}$

The UE selects the starting index of the CDD basis subset $\overline{D}_{in}$ from the $N_3$-sized set $[0,1, \ldots, N_3-1]$.

In accordance with an embodiment, the UE is configured to report the selected value of $\overline{D}_{in}$ using a $\lceil \log_2 N_3 \rceil$-bit indicator.

In accordance with an embodiment, the UE is configured to select and report the parameter $\overline{D}_{in}$ such that the FD basis vector associated with the SCI (which is not necessarily the first FD basis vector) is included in the CDD basis subset. By doing so, and according to an embodiment, the value range of $\overline{D}_{in}$ is reduced from $N_3$ to $\overline{D}$ values and is given by a function of $N_3$ and $\overline{D}$, and is defined by equation (1):

$$\mathrm{mod}(d_{SCI}-\overline{D}+1+n, N_3), n \in [0, \overline{D}-1] \quad (1)$$

where $d_{SCI}$ is the index of the FD basis vector associated with the SCI.

When the UE is enforced to perform a cyclic shift on the selected combining coefficients and the selected FD basis vectors per layer with respect to the FD basis vector that is associated with the SCI (e.g., when the SCI is given by a $\lceil \log_2(2U) \rceil$-bit indicator, see above), the FD basis vector associated with the strongest combining coefficient per layer is cyclically shifted to the FD basis vector index 0. After performing cyclic shift operation by the UE, the first FD basis vector (corresponding to index 0) is associated with the strongest combining coefficient. Therefore, according to an embodiment, the parameter $\overline{D}_{in}$ is selected by the UE in a way that the CDD basis subset contains the first FD basis vector which is associated with index 0, see FIG. 3.

Figure 3:
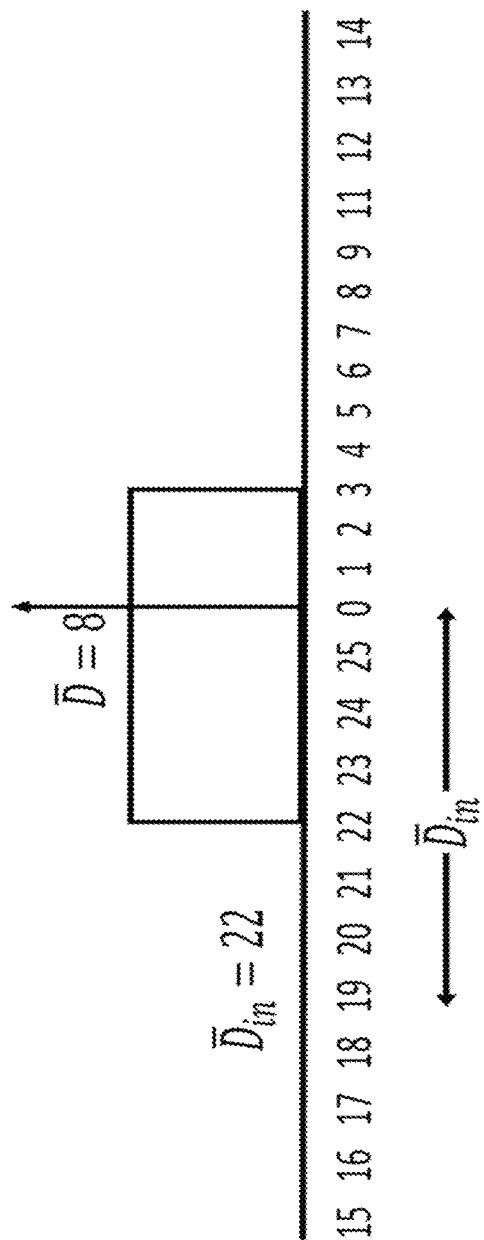
FIG. 3 illustrates an example of selected CDD basis subset of size $\overline{D}$=8 with $\overline{D}_{in}$=22.

FIG. 3 illustrates the selected CDD basis subset of size $\overline{D}=8$ with $\overline{D}_{in}=22$. The FD basis vector 0 is included when $\overline{D}_{in}$ is given by one of the values from the set [19,20,21,22, 23,24,25,0].

Table 1 shows the corresponding value range of $\overline{D}_{in}$ for different values of $N_3$ and $\overline{D}$. It can be observed that the value range of $\overline{D}_{in}$ is dependent on $N_3$ and $\overline{D}$.

TABLE 1

Values of $\overline{D}_{in}$ for different combinations of $N_3$ and $\overline{D}$

| $N_3$ | $\overline{D}$ | Values of $\overline{D}_{in}$ |
|---|---|---|
| 26 | 6 | [0, 21, 22, 23, 24, 25] |
|  | 8 | [0, 19, 20, 21, 22, 23, 24, 25] |
|  | 10 | [0, 17, 18, 19, 20, 21, 22, 23, 24, 25] |
|  | 12 | [0, 15, 16, 17, 18, 19, 20, 21, 22, 23, 24, 25] |
| 38 | 8 | [0, 33, 34, 35, 36, 37] |
|  | 10 | [0, 29, 30, 31, 32, 33, 34, 35, 36, 37] |
|  | 13 | [0, 26, 27, 28, 29, 30, 31, 32, 33, 34, 35, 36, 37] |
|  | 16 | [0, 23, 24, 25, 26, 27, 28, 29, 30, 31, 32, 33, 34, 35, 36, 37] |

In accordance with an embodiment, when the UE is configured to perform a cyclic shift operation on the selected combining coefficients and the selected FD basis vectors per layer with respect to the FD basis vector that is associated with the SCI, the UE is configured to select and report the parameter $\overline{D}_{in}$ such that the first FD basis vector (associated with index 0) is included in the CDD basis subset. By doing so, and according to an embodiment, the value range of $\overline{D}_{in}$ is reduced from $N_3$ to $\overline{D}$ values and is given by a function of $N_3$ and $\overline{D}$, and is defined by equation (2):

$$\mathrm{mod}(N_3-\overline{D}+1+n, N_3), n \in [0, \overline{D}-1] \quad (2)$$

According to an embodiment, the UE may be configured to report $\overline{D}_{in}$ using a $\lceil \log_2 \overline{D} \rceil$-bit indicator.

In accordance with another embodiment, instead of reporting $\overline{D}_{in}$ in equation (1) or equation (2), the selected value of n is reported using a $\lceil \log_2 \overline{D} \rceil$-bit indicator.

Further Reduction of the Value Range of $\overline{D}_{in}$

As shown in Equation (1) and (2), the size of the bit indicator for reporting the value of $\overline{D}_{in}$ depends on the CDD subset size $\overline{D}$. Hence, the feedback overhead for reporting $\overline{D}_{in}$ increases with increasing values of $\overline{D}$. To decouple the feedback overhead from the CDD subset size, the value range of $\overline{D}_{in}$ may be limited to d' values, such that the corresponding bit indicator for $\overline{D}_{in}$ has a fixed size.

In accordance with an embodiment, the value of the starting index of the CDD subset $\overline{D}_{in}$ is reported using a $\lceil \log_2 d' \rceil$-bit indicator. The value range of $\overline{D}_{in}$ is defined by d' values, where the parameter d' is either higher-layer configured or a priori known or determined by the UE for given parameters $N_3$ and/or $\overline{D}$.

Figure 4:
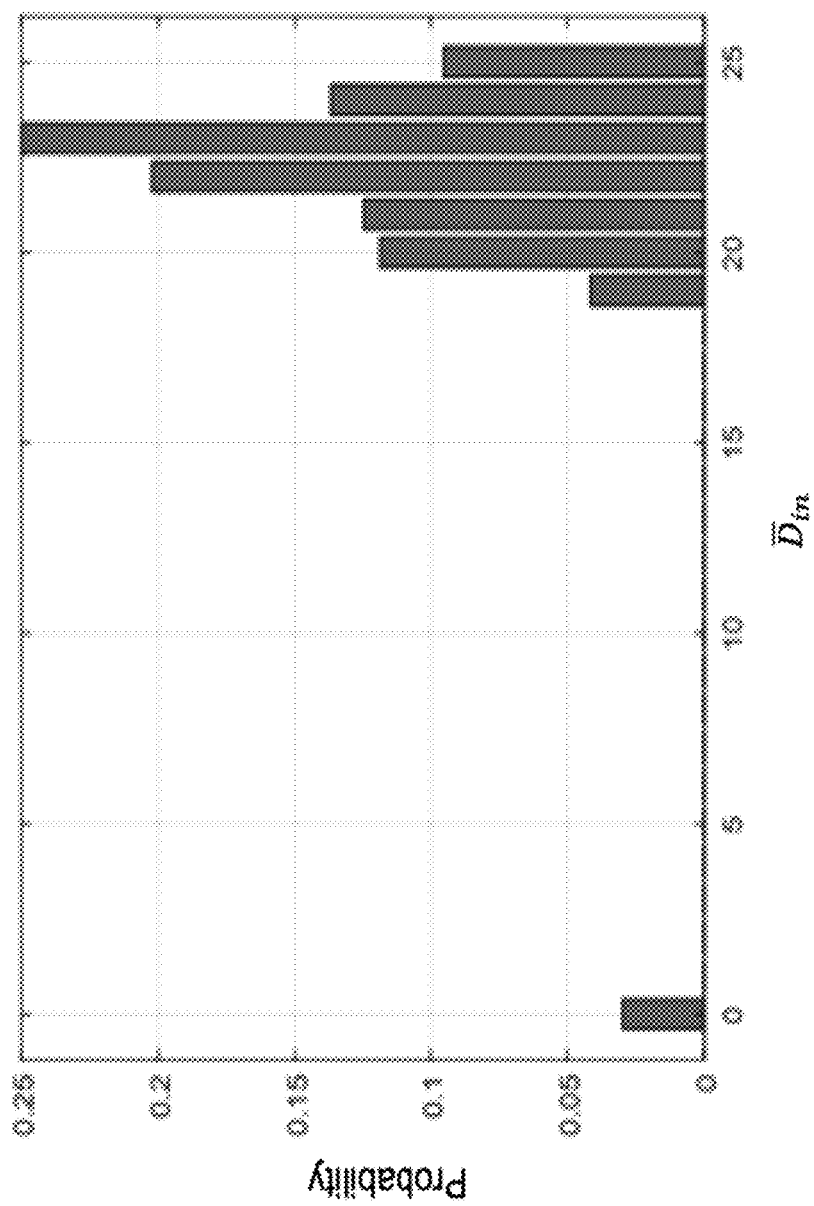
FIG. 4 illustrates the distribution of the selected $\overline{D}_{in}$ values for $N_3$=26, $\overline{D}$=8 and D=4, ∀r for a rank-4 transmission.

FIG. 4 shows the distribution of the selected $\overline{D}_{in}$ values for an example configuration of $N_3=26$, $\overline{D}=8$ and $\overline{D}=4$ for a rank-4 transmission. Although, the selected $\overline{D}_{in}$ values are spread over the entire allowable range of $\overline{D}_{in}$, the indices that lie in the center of the allowable range of $\overline{D}_{in}$ are selected with higher probability than the remaining indices.

The value range of $\overline{D}_{in}$ may therefore be defined by those values that are selected with high probability. It can also be observed that for the values of $\overline{D}_{in}$ that are selected with high probability, the CDD basis subset is centered with FD index 0 that is associated with the strongest coefficient.

According to an embodiment, the value range of the parameter n is reduced from $\overline{D}$ to d' values, and d' is either higher-layer configured or a priori known or determined by the UE for given parameters $N_3$ and/or $\overline{D}$, and wherein the value n is reported by the UE using a $\lceil \log_2 d' \rceil$-bit indicator.

In accordance with an embodiment, the value of the starting index of the CDD subset $\overline{D}_{in}$ is reported using a $\lceil \log_2 d' \rceil$-bit indicator, where the parameter $\overline{D}_{in}$ is defined by equation (3):

$$\overline{D}_{in} = N_3 - \left\lceil \frac{\overline{D}}{2} \right\rceil + q, \quad (3)$$

where $q \in \mathbb{Z}$, and the value range of q is defined by d' values. According to an embodiment, the parameter d' is either higher-layer configured or a priori known or determined by the UE for given parameters $N_3$ and/or $\overline{D}$.

For example, for d'=4, $q \in [-2,1,0,1]$ and for d'=2, $q \in [-2,1]$, and the gNB configures either d'=4 or d'=2 to the UE for the value range of q.

In one instance, $d'=2^{d''}$, where $d'' \in \mathbb{Z}^+$. In another instance, d' is an even numbered value. In another instance, d' is fixed and given by d'=2 or d'=4. In another instance, d' is given by $$d' = \left\lceil \frac{\overline{D}}{2} \right\rceil \text{ or } d' = \left\lfloor \frac{\overline{D}}{2} \right\rfloor.$$

in another instance, $d'=\overline{D}$.

Different examples of the value range are proposed in the following. In one example, when d'=4, q∈[−2,1,0,1], q∈[−1,0,1,2], q∈[0,1,2,3] or q∈[1,2,3,4]. In another example, when d'=2, q∈[−2,1], q∈[−1,0], q∈[0,1] or q∈[1,2].

The value range of the parameter q may be higher layer configured, or fixed and a priori known to the UE or determined by the UE based on the configured $N_3$ and $\overline{D}$ values.

The UE may be configured to report the selected value of q to the gNB, instead of reporting the parameter $\overline{D}_{in}$.

As previously described, according to an embodiment, the value range of the parameter $\overline{D}_{in}$ is reduced from $\overline{D}$ to d' values, wherein the parameter $\overline{D}_{in}$ is defined by $$\overline{D}_{in} = N_3 - \left\lceil \frac{\overline{D}}{2} \right\rceil + q,$$

wherein the value range of q∈ℤ is limited to d' values and as mentioned above d' is either higher-layer configured or a priori known or determined by the UE for given parameters $N_3$ and/or $\overline{D}$.

Mapping Rule for q

The gNB determines the value of $\overline{D}_{in}$ from the reported value of q based on equation (2). Each value of q selected from the pre-defined set of d' values is mapped to a codepoint, represented by a value of a $\lceil \log_2 d' \rceil$-bit indicator. For this mapping, a specific mapping rule is required. In the following, two mapping rules are proposed.

In accordance with an embodiment, each of the d' codepoints is represented by a $\lceil \log_2 d' \rceil$-bit indicator, where the first codepoint is represented by $\lceil \log_2 d' \rceil$-zeros and associated with the smallest integer value in the value range of q. The remaining values in the pre-defined set of d' values are mapped to codepoints in an increasing order, as shown in Table 2, option A.

In accordance with an embodiment, if the value 0 is contained in the value range of q, the zero value is mapped to the first codepoint, represented by $\lceil \log_2 d' \rceil$-zeros. The remaining values in the pre-defined set of d' values are mapped to codepoints in an increasing order, as shown in Table 2 below, option B.

TABLE 1

Two mapping options for mapping the q values from the set
[−1, 0, 1, 2] to the codepoints, d' = 4.

| Option A | | Option B | |
| --- | --- | --- | --- |
| q | Codepoint | q | Codepoint |
| −1 | 00 | 0 | 00 |
| 0 | 01 | 1 | 01 |
| 1 | 10 | 2 | 10 |
| 2 | 11 | −1 | 11 |

Table 3 compares the feedback overhead when reporting q or n for two different values of $\overline{D}$. It can be seen that when $\overline{D}$=8 and when the range of q is limited to d'=2 values, the saving in overhead is 2 bits when reporting the selected value of q compared to reporting the selected value of n, whereas, when the range of q is limited to d'=4 values, the saving in overhead is 1 bit. For $\overline{D}$=10, the saving in overhead is 3 bits and 2 bits, when the range of q values is limited to d'=2 and d'=4 values, respectively.

TABLE 3

Number of bits required for the reporting of n and q for two different values of $\overline{D}$ and d'.

| $\overline{D}$ | Number of bits required to report n (Equation (1), (2)) | Number of bits required to report q (d' = 2) (Equation (3)) | Number of bits required to report q (d' = 4) (Equation (3)) |
| --- | --- | --- | --- |
| 8 | 3 | 1 | 2 |
| 10 | 4 | 1 | 2 |

Note that the value range of n covers all allowable $\overline{D}_{in}$ values, whereas the range of q includes only the most probable values of n.

In accordance with an embodiment, in order to save feedback overhead for the reporting of the parameter $\overline{D}_{in}$, the UE may be configured to report the parameter q based on equation (3) or n based on equation (1) or (2), that determines the parameter $\overline{D}_{in}$. The reporting of either the parameter n or q may depend on the parameter $\overline{D}$. For example, the value of n may be reported when $\overline{D}$ is less than a threshold value, and otherwise the value of q may be reported. For example, when $\overline{D}$<8, the UE may report the selected value of n, otherwise, it reports the selected value of q.

Rank Dependent $\overline{D}_{in}$

For an increasing transmission rank, the delay spread of the corresponding beam-formed channel impulse response associated with a layer of the precoder matrix becomes larger, thus requiring a larger CDD basis subset size of the precoder matrix for covering the delay spread of the corresponding beam-formed channel impulse response. Therefore, the size of the CDD basis subset $\overline{D}$ depends on the transmission rank, and the value of $\overline{D}$ may increase with increasing transmission rank. Moreover, for a low rank transmission, the selected value of $\overline{D}_{in}$ from the pre-defined value range of q, given by equation (2), does not significantly affect the performance. Therefore, for low-rank transmission, $\overline{D}_{in}$ can be fixed.

In accordance with an embodiment, the reporting of the parameter $\overline{D}_{in}$ may be dependent on the transmission rank. For a low rank-R' transmission, the parameter $\overline{D}_{in}$ may be fixed (hence not reported). For example, $\overline{D}_{in}$ may be given by $$\overline{D}_{in} = N_3 - \left\lceil \frac{\overline{D}}{2} \right\rceil + q, q \in \mathbb{Z},$$

where the value of q is a priori known by the UE or higher layer configured. In one instance, R'=1. In another instance, R'∈{1,2}.

According to an embodiment, the reporting of the parameter $\overline{D}_{in}$ may be performed when the transmission rank is larger than a threshold.

Dependency of $\overline{D}_{in}$ on $\overline{D}$

In accordance with an embodiment, the reporting of the parameter $\overline{D}_{in}$ may depend on the configured parameter $\overline{D}$. The value of $\overline{D}_{in}$ (or the associated parameter n or q) may be reported when the configured value of $\overline{D}$ is smaller than a threshold value, otherwise the value of $\overline{D}_{in}$ (or the associated parameter n or q) is fixed (and hence not reported). For example, for $N_3$=26, the set of $\overline{D}$ values that can be configured is given by [6,8,10,13], and for $\overline{D}$=6, $\overline{D}_{in}$ is reported and for $\overline{D}$=8, 10, or $\overline{D}$=13, $\overline{D}_{in}$ is fixed and not reported.

Rank Dependent $\overline{D}$

For an increasing transmission rank, the delay spread of the corresponding beam-formed channel impulse response associated with a layer of the precoder matrix becomes larger, thus requiring a larger CDD basis subset size of the precoder matrix for covering the delay spread of the corresponding beam-formed channel impulse response. Therefore, according to an embodiment, the size of the CDD basis subset $\overline{D}$ depends on the transmission rank, and the value of $\overline{D}$ may increase with increasing transmission rank.

In accordance with an embodiment, the parameter $\overline{D}$, defining the CDD basis subset size, may depend on the transmission rank. The size of the CDD basis subset configured for a rank-R' transmission may always be equal or smaller than the size of the CDD basis subset configured for a rank-R" transmission, where R<R". For example, for R'=2, $\overline{D}$=6, and for R"=3, $\overline{D}$=8. In another example, for R'=2, $\overline{D}$=6, and for R"=4, $\overline{D}$=10.

Dependency of CDD Basis Subset Size on the Number of Configured SD (Spatial Domain) Basis Vectors In typical channel settings, the delay impulse response associated with an SD beam is associated with only one or few channel cluster(s) of the radio channel, where each channel cluster is characterized by a single mean delay. Hence, the configured CDD basis subset D depends on the configured number of SD beams U or $U^{(l)}$. For an increasing number of SD beams, the delay spread of the corresponding beam-formed channel impulse response becomes larger, thus requiring a larger CDD basis subset for covering the delays of the precoder matrix.

In accordance with an embodiment, the size of the CDD basis subset $\overline{D}$ depends on the configured number of SD basis vectors. For example, the configured CDD basis subset size $\overline{D}$ increases with increasing values of U or $U^{(l)}$. For example, $\overline{D}$=8 for U=4, and $\overline{D}$=10 for U=6. In another example, $\overline{D}$=8 for U=4, and $\overline{D}$=6 for U=6.

In accordance with embodiments, in order to control the feedback overhead, the value of $\overline{D}$ configured for larger number of SD basis vectors may be smaller than the value of $\overline{D}$ configured for smaller number of SD basis vectors.

For example, $\overline{D}$=10 for U=4 and $\overline{D}$=6 for U=6.

SCI

In accordance with an embodiment, the SCI may be configured to be rank-dependent. For example, for a rank-1 transmission, the SCI is given by a $\lceil \log_2(K_{NZ}) \rceil$-bit indicator, and for a higher rank (RI>1) transmission, the SCI is given by a $\lceil \log_2(2U) \rceil$-bit indicator.

CDD Basis Subset-Based Reporting

In accordance with embodiments, the UE is configured to use CDD basis subset-based reporting when the configured number of CQI subbands $N_{SB}$ is greater than a threshold value. For example, $N_{SB}$>13.

In accordance with embodiments, the UE is configured to use the CDD basis subset-based reporting when the total number of subbands $N_3$ is greater than a threshold value. For example, $N_3$>19.

Reporting of Bitmaps

When the UE is enforced to perform a cyclic shift operation on the selected combining coefficients and the selected DD basis vectors per layer with respect to the FD basis vector associated with the SCI, e.g., the SCI is given by a $\lceil \log_2(2U) \rceil$-bit indicator, a reporting of a '1' in the bitmap used to indicate the position of the strongest coefficient is redundant. Therefore, the size of the bitmap reported by the UE can be reduced by a single bit per layer.

Note that when the UE is not enforced to perform a cyclic shift operation on the selected combining coefficients, e.g., when the SCI is given by a $\lceil \log_2 K_{NZ} \rceil$-bit indicator, the complete bitmap of size $2U^{(l)}D^{(l)}$ is required to indicate the SD basis vector index and FD basis vector index of the SCI.

In accordance with an embodiment, when the UE is enforced to perform a cyclic shift operation on the selected combining coefficients and the selected DD basis vectors per layer with respect to the FD basis vector associated with the SCI, the size of the bitmap associated with each layer can be reduced from to $2U^{(l)}D^{(l)}$ to $2U^{(l)}D^{(l)}-1$ bits.

Since the SCI may be rank-dependent, the size of the bitmap may be rank-dependent as well. For example, for a rank-1 (RI=1) transmission, the SCI is given by a $\lceil \log_2(K_{NZ}) \rceil$-bit indicator, and the associated bitmap has a size of $2U^{(l)}D^{(l)}$, and in the case of higher rank transmission (RI=3 or RI=4), the SCI is given by a $\lceil \log_2(2U) \rceil$-bit indicator and the size of the bitmap per layer is given by $2U^{(l)}D^{(l)}-1$.

Reporting Number of Non-Zero Combining Coefficients

The indicator associated with the reporting of the selected NNZCC across all layers in CSI part 1 is given by a $\lceil \log_2 g \rceil$-bit indicator. The particular value of g may depend on the transmission rank.

In accordance with an embodiment, the $\lceil \log_2 g \rceil$-bit indicator indicating the number of non-zero combining coefficients for the CSI matrix of the CSI report in CSI part 1 is rank-dependent.

In one instance, $g=K_0$ for RI=1, and $g=2K_0$, for RI>1. Here, $K_0$ denotes the maximum NNZCC per layer, which is higher layer configured to the UE by the gNB. The amplitude and phase information associated with the strongest coefficient of each layer is normalized to 1 and hence not reported. Therefore, the UE may indicate only the NNZCC across all layers for which the amplitude and phase information is reported in CSI part 2.

In accordance to an embodiment, the sum of NNZCC across all layers reported in CSI part 1 is given by $\Sigma_{l=0}^{RI-1} NZ_l-RI$.

In accordance with an embodiment, the UE is configured to indicate a number of NNZCC across all layers, given by $\Sigma_{l=0}^{RI-1} NZ_l$, in CSI part 1 by $\Sigma_{l=0}^{RI-1} NZ_l-RI$.

Reporting of D'

In accordance to an embodiment, the selected $D^{(l)'}$ may be indicated by the UE by unused code-points of other UCI 1 parameters. For example, the unused code-points used for the indication of the number of non-zero combining coefficients may be used to report in addition the 1-bit indicator for $D^{(l)'}$ for all layers. For RI>1, the total number of non-zero combining coefficients across all RI layers is given by $2K_0$-RI when reporting $\Sigma_{l=0}^{RI-1} NZ_l-RI$ NNZCC across all layers. For example, when $K_0$=42, 7 bits are used to indicate the number of non-zero combining coefficients, and out of the 128 code-points, the 44+RI un-used code-points are used for the indication of the selected value of $D^{(l)'}$. Different examples are provided in the following. In one instance, the code-points 1 to 84-RI indicate the selected number of non-zero combining coefficients and indicate that $D^{(l)'}=D^{(l)}$ for all layers, and the remaining codepoints 84-RI+1 to 128 indicate the selected numbers of non-zero combining coefficients 1 to 44+RI, and that $D^{(l)'}=\gamma D^{(l)}$ for all layers. In another instance, the code-points 1 to 84-RI indicate the selected number of non-zero combining coefficients and indicate that $D^{(l)'}=D^{(l)}$ for all layers, and the remaining codepoints 84-RI+1 to 128 indicate the selected numbers of non-zero combining coefficients 1, 3, 5 and so on, and that $D^{(l)'}=\gamma D^{(l)}$ for all layers. In another instance, the code-points 1 to 84-RI indicate the selected number of non-zero combining coefficients and indicate that $D^{(l)'}=D^{(l)}$ for all layers, and the remaining codepoints 84-RI+1 to 128 indicate the selected numbers of non-zero combining coefficients 2, 4, 6 and so on, and that $D^{(l)}=\gamma D^{(l)}$ for all layers.

Additional embodiments relating to actions performed by the UE have already been described and need not be repeated again.

Figure 5:
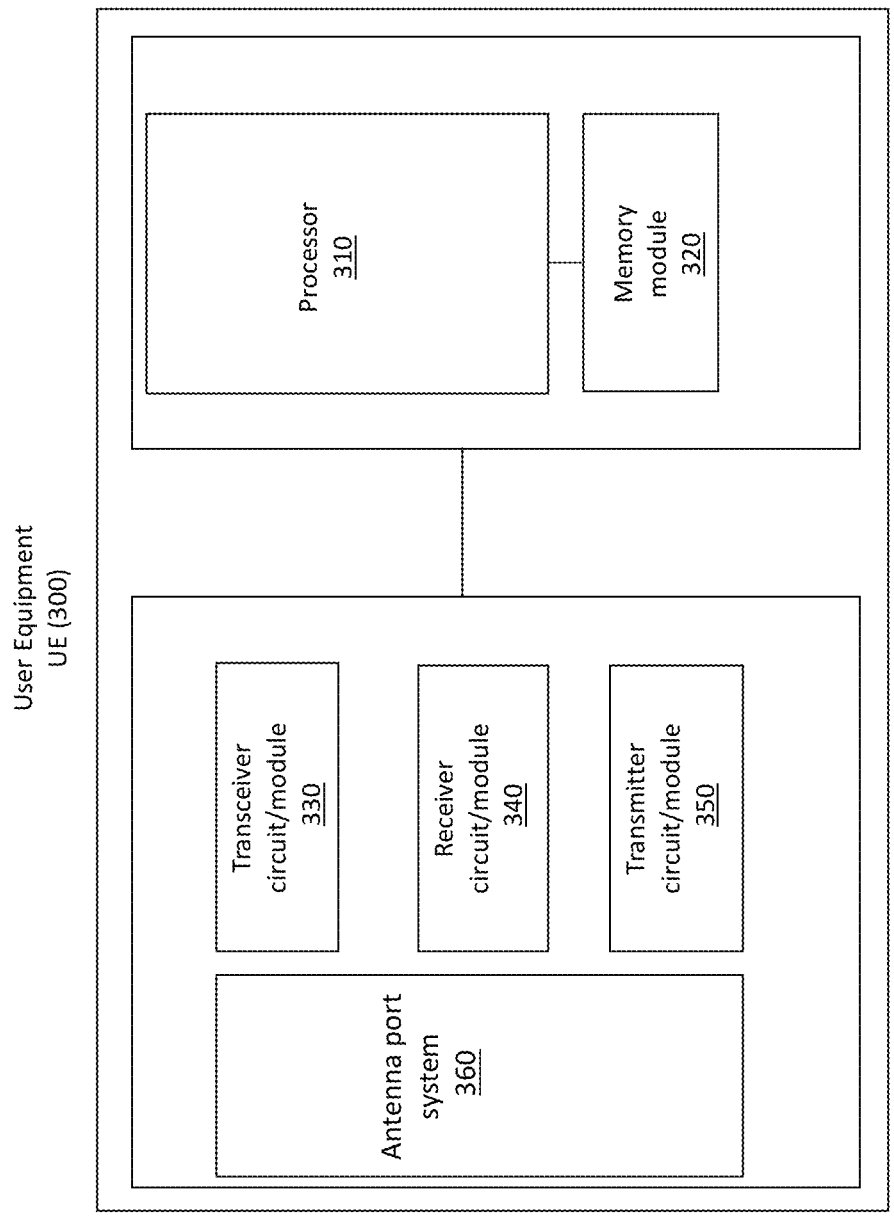
FIG. 5 is an exemplary block diagram depicting a UE according to exemplary embodiments herein.

In order to perform the methods steps and operations of the UE previously described, there is also provided a UE 300, as shown in FIG. 5, which UE 300 comprises a processor 310 or processing circuit or a processing module or a processor or means 310; a receiver circuit or receiver module 340; a transmitter circuit or transmitter module 350; a memory module 320 a transceiver circuit or transceiver module 330 which may include the transmitter circuit 350 and the receiver circuit 340. The UE 300 further comprises an antenna system 360 which includes antenna circuitry for transmitting and receiving signals to/from at least the UE. The antenna system employs beamforming as previously described.

The UE 300 may operate in any radio access technology including 2G, 3G, 4G or LTE, LTE-A, 5G, WLAN, and WiMax etc. that support beamforming technology. The processing module/circuit 310 includes a processor, microprocessor, an application specific integrated circuit (ASIC), field programmable gate array (FPGA), or the like, and may be referred to as the "processor 310." The processor 310 controls the operation of the UE 300 and its components. Memory (circuit or module) 320 includes a random access memory (RAM), a read only memory (ROM), and/or another type of memory to store data and instructions that may be used by processor 310. In general, it will be understood that the UE 300 in one or more embodiments includes fixed or programmed circuitry that is configured to carry out the operations in any of the embodiments disclosed herein.

In at least one such example, the UE 300 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein. Further, it will be appreciated that the UE 300 may comprise additional components not shown in FIG. 5.

There is also provided a computer program comprising instructions which when executed on at least one processor of the UE, to cause the at least one processor to carry out any one of the method steps disclosed herein.

There is also provided a method performed by a network node or gNB as previously described. The method comprises: transmitting to a UE a radio signal via a MIMO channel, wherein the radio signal contains at least one DL reference signal according to a DL reference signal configuration, for enabling the UE to estimate said MIMO channel based on said received at least one DL reference signal for configured subbands and calculate a precoder matrix or a CSI matrix for a number of antenna ports of the gNB and configured subbands; the precoder matrix being based on a first codebook and on a second codebook and a set of combining coefficients for complex scaling/combining one or more of vectors selected from the first codebook and the second codebook; where, the first codebook contains one or more transmit-side spatial beam components of the precoder matrix, the second codebook contains one or more delay components of the precoder matrix, and receiving, from the UE, a CSI feedback report and/or a PMI and/or a PMI/RI, used to indicate the precoder matrix or the CSI matrix for the configured antenna ports.

Additional operations performed by the gNB or network node in terms of at least configuring the UE have already been described and need not be repeated again.

There is also provided a network node or gNB (not shown) in order to perform the method steps and the previously described operations. The gNB comprises a processor or processing circuit or a processing module or a processor or means; a receiver circuit or receiver module; a transmitter circuit or transmitter module; a memory module a transceiver circuit or transceiver module which may include the transmitter circuit and the receiver circuit. The gNB further comprises an antenna system which includes antenna circuitry for transmitting and receiving/transmitting signals to/from at least the UE. The antenna system employs beamforming as previously described.

The gNB may operate in any radio access technology including 2G, 3G, 4G or LTE, LTE-A, 5G, WLAN, and WiMax etc. that support beamforming technology. The processing module/circuit includes a processor, microprocessor, an application specific integrated circuit (ASIC), field programmable gate array (FPGA), or the like, and may be referred to as the "processor." The processor controls the operation of the gNB and its components. Memory (circuit or module) includes a random access memory (RAM), a read only memory (ROM), and/or another type of memory to store data and instructions that may be used by processor. In general, it will be understood that the gNB in one or more embodiments includes fixed or programmed circuitry that is configured to carry out the operations in any of the embodiments disclosed herein.

In at least one such example, the gNB includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the gNB may comprise additional components.

There is also provided a computer program comprising instructions which when executed on at least one processor of the gNB, cause the at least one processor to carry out the method described.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc. that may employ beamforming technology.

REFERENCES

[1] 3GPP TS 38.214 V15.3.0: "3GPP; TSG RAN; NR; Physical layer procedures for data (Rel. 15)," September 2018

[2] Samsung "Revised WID: Enhancements on MIMO for NR", RP-182067, 3GPP RAN#81, Gold Coast, Australia, Sep. 10-13, 2018.

The invention claimed is:

1. A method performed by a User Equipment (UE), the method comprising:
   receiving from a network node, (gNB) a radio signal via a Multiple Input Multiple Output (MIMO) channel, wherein the radio signal contains at least one Down-Link (DL) reference signal according to a DL reference signal configuration;
   estimating the MIMO channel based on the received at least one DL reference signal for configured subbands;
   calculating a precoder matrix or a Channel State Information, (CSI) matrix for a number of antenna ports of the gNB and configured subbands, $N_3$, the precoder matrix being based on a first codebook and on a second codebook and a set of combining coefficients for complex scaling/combining one or more vectors selected from the first codebook and the second codebook;
   where,
      the first codebook contains one or more transmit-side spatial beam components of the precoder matrix or CSI matrix; and
      the second codebook contains one or more delay components of the precoder matrix or CSI matrix;
   determining a common delay domain (CDD) basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}_{in}$ values; and
   reporting, to the gNB, a CSI feedback report and/or a Precoder matrix Indicator (PMI) and/or a PMI/Rank Indicator (PMI/RI) used to indicate the precoder matrix or the CSI matrix for the configured antenna ports and configured subbands, wherein the selected vectors from the CDD basis subset are indicated in the reporting, for each layer, by a layer-specific delay domain (LDD) basis subset indicator; and the parameter $\overline{D}_{in}$ is reported to the gNB.

2. The method according to claim 1, further comprising receiving a configuration from the gNB, said configuration comprising a CSI report configuration including at least one higher-layer parameter, $D^{(l)}$, representing a number of delays per layer used for the configuration of the precoder matrix or CSI matrix.

3. The method according to claim 2, wherein the number of delays $D^{(l)}$ is layer-independent and identical for all layers, such that $D^{(l)}=D$, and configuring the UE with only a single parameter D for the configuration of the precoder matrix or CSI matrix.

4. The method according to claim 1, further comprising performing a $N_3$-modulo shift operation on all delay indices associated with the selected delay vectors indicated by the LDD basis subset indicator and on all non-zero combining coefficients of a layer with respect to a delay index associated with the strongest coefficient indicator (SCI) of the layer.

5. The method according to claim 4, wherein the SCI is configured to be rank-dependent, wherein for RI=1 transmission, the SCI is given by a $\lceil \log_2(K_{NZ}) \rceil$-bit indicator, and for RI>1 transmission, the SCI is given by $\lceil \log_2(2U) \rceil$-bit indicator.

6. The method according to claim 1, wherein the parameter $\overline{D}_{in}$ is selected, such that the first delay vector associated with index 0 is included in the CDD basis sub set.

7. The method according to claim 1, wherein the value range of the parameter $\overline{D}_{in}$ is defined by:
   $\overline{D}_{in} = \mathrm{mod}(d_{SCI} - \overline{D} + 1 + n, N_3)$, $n \in [0, \overline{D}-1]$, wherein $d_{SCI}$ is the index of the Frequency Domain (FD) basis vector associated with the SCI, and the UE is configured to report $\overline{D}_{in}$ using a $\lceil \log_2 \overline{D} \rceil$-bit indicator.

8. The method according to claim 1, wherein the value range of the parameter $\overline{D}_{in}$ is defined by:
   $\overline{D}_{in} = \mathrm{mod}(N_3 - \overline{D} + 1 + n, N_3)$, $n \in [0, \overline{D}-1]$, and the UE is configured to report $\overline{D}_{in}$ using a $\lceil \log_2 \overline{D} \rceil$-bit indicator.

9. The method according to claim 1, wherein the parameter $\overline{D}$, defining the CDD basis subset size, depends on the transmission rank.

10. A User Equipment (UE) comprising a processor (310) and a memory said memory containing instructions executable by said processor whereby said UE is configured to:
    receive from a network node (gNB) a radio signal via a Multiple Input Multiple Output (MIMO) channel, wherein the radio signal contains at least one Down-Link (DL) reference signal according to a DL reference signal configuration;
    estimate the MIMO channel based on the received at least one DL reference signal for configured subbands;
    calculate a precoder matrix or a Channel State Information (CSI) matrix for a number of antenna ports of the gNB and configured subbands, $N_3$ the precoder matrix being based on a first codebook and on a second codebook and a set of combining coefficients for complex scaling/combining one or more vectors selected from the first codebook and the second codebook;
    where,
       the first codebook contains one or more transmit-side spatial beam components of the precoder matrix or CSI matrix; and
       the second codebook contains one or more delay components of the precoder matrix or CSI matrix;
    determine a common delay domain (CDD) basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}$ values; and
    report, to the gNB, a CSI feedback report and/or a Precoder matrix Indicator (PMI) and/or a PMI/Rank Indicator (PMI/RI) used to indicate the precoder matrix or the CSI matrix for the configured antenna ports and configured subbands; wherein the selected vectors from the CDD basis subset are indicated in the reporting, for each layer, by a layer-specific delay domain (LDD) basis subset indicator; and the parameter $\overline{D}_{in}$ is reported to the gNB.

11. A method performed by a network node (gNB) the method comprising:
    transmitting to a User Equipment (UE) a radio signal via a Multiple Input Multiple Output (MIMO) channel, wherein the radio signal contains at least one Down-Link (DL) reference signal according to a DL reference signal configuration, for enabling the UE to:
       estimate the MIMO channel based on the received at least one DL reference signal for configured subbands;

calculate a precoder matrix or a Channel State Information (CSI) matrix for a number of antenna ports of the gNB and configured subbands, $N_3$; the precoder matrix being based on a first codebook and on a second codebook and a set of combining coefficients for complex scaling/combining one or more vectors selected from the first codebook and the second codebook;

where, the first codebook contains one or more transmit-side spatial beam components of the precoder matrix or CSI matrix; and the second codebook contains one or more delay components of the precoder matrix or CSI matrix;

determine a common delay domain (CDD) basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}$ values; and receiving, from the UE, a CSI feedback report and/or a Precoder matrix Indicator (PMI) and/or a PMI/Rank Indicator (PMI/RI) used to indicate the precoder matrix or the CSI matrix for the configured antenna ports and configured subbands; wherein the selected vectors from the CDD basis subset are indicated in the report, for each layer, by a layer-specific delay domain (LDD) basis subset indicator; and the parameter $\overline{D}_{in}$ is reported to the gNB.

12. A network node comprising a processor and a memory, said memory containing instructions executable by said processor whereby said network node is configured to:

transmit to a User Equipment (UE) a radio signal via a Multiple Input Multiple Output (MIMO) channel, wherein the radio signal contains at least one Downlink (DL) reference signal according to a DL reference signal configuration; for enabling the UE to:

estimate the MIMO channel based on the received at least one DL reference signal for configured subbands;

calculate a precoder matrix or a Channel State Information (CSI) matrix for a number of antenna ports of the gNB and configured subbands, $N_3$; the precoder matrix being based on a first codebook and on a second codebook and a set of combining coefficients for complex scaling/combining one or more vectors selected from the first codebook and the second codebook;

where, the first codebook contains one or more transmit-side spatial beam components of the precoder matrix or CSI matrix, the second codebook contains one or more delay components of the precoder matrix or CSI matrix;

determine a common delay domain (CDD) basis subset of the selected vectors associated with the delay components across all layers of the precoder matrix or CSI matrix, wherein the CDD basis subset is defined by a parameter $\overline{D}$ representing the number of elements of the CDD basis subset, and a parameter $\overline{D}_{in}$ representing the first index of the $\overline{D}$ delay vectors from the second codebook, wherein the value range of the parameter $\overline{D}_{in}$ is reduced from $N_3$ to $\overline{D}$ values; and receive, from the UE, a CSI feedback report and/or a Precoder matrix Indicator (PMI) and/or a PMI/Rank Indicator (PMI/RI) used to indicate the precoder matrix or the CSI matrix for the configured antenna ports and configured subbands; wherein the selected vectors from the CDD basis subset are indicated in the report, for each layer, by a layer-specific delay domain (LDD) basis subset indicator; and the parameter $\overline{D}_{in}$ is reported to the gNB.

\* \* \* \* \*

UNITED STATES PATENT AND TRADEMARK OFFICE
CERTIFICATE OF CORRECTION

PATENT NO. : 11,901,996 B2
APPLICATION NO. : 17/606924
DATED : February 13, 2024
INVENTOR(S) : Venkatesh Ramireddy et al.

Page 1 of 1

It is certified that error appears in the above-identified patent and that said Letters Patent is hereby corrected as shown below:

In the Claims

Column 35, Line 34 should read:
codebook, wherein the value range of the parameter $\overline{D}_{in}$ is reduced from $N_3$ to $\overline{D}$ values; and Column 36, Line 29 should read:
gNB and configured subbands, $N_3$, the precoder matrix Signed and Sealed this
Twenty-seventh Day of May, 2025

Coke Morgan Stewart
*Acting Director of the United States Patent and Trademark Office*